US012476359B2

(12) United States Patent
Lee et al.

(10) Patent No.: US 12,476,359 B2
(45) Date of Patent: Nov. 18, 2025

(54) PHASED ARRAY ANTENNA WITH HIGH IMPEDANCE SURFACE

(71) Applicant: POSTECH RESEARCH AND BUSINESS DEVELOPMENT FOUNDATION, Pohang-si (KR)

(72) Inventors: Jae Yeong Lee, Pohang-si (KR); Won Bin Hong, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 461 days.

(21) Appl. No.: 17/981,358

(22) Filed: Nov. 4, 2022

(65) Prior Publication Data

US 2023/0155288 A1 May 18, 2023

(30) Foreign Application Priority Data

Nov. 18, 2021 (KR) ........................ 10-2021-0159784
Jan. 27, 2022 (KR) ........................ 10-2022-0012481

(51) Int. Cl.
*H01Q 3/34* (2006.01)
*H01Q 1/48* (2006.01)
*H01Q 1/52* (2006.01)
*H01Q 9/04* (2006.01)

(52) U.S. Cl.
CPC ................ *H01Q 3/34* (2013.01); *H01Q 1/48* (2013.01); *H01Q 1/52* (2013.01); *H01Q 9/0421* (2013.01); *H01Q 9/045* (2013.01)

(58) Field of Classification Search
CPC .. H01Q 3/34; H01Q 1/48; H01Q 1/52; H01Q 9/0421; H01Q 9/045; H01Q 15/006; H01Q 21/08; H01Q 1/523
See application file for complete search history.

(56) References Cited

U.S. PATENT DOCUMENTS 11,005,519 B1 * 5/2021 Turkowski ........... H04B 7/0408
2011/0057741 A1 * 3/2011 Dayan ..................... H01P 5/107
333/26
2017/0352960 A1 * 12/2017 Zhang .................. H05K 1/0221

FOREIGN PATENT DOCUMENTS

KR 20070103770 A * 10/2007 ............. H01Q 13/00
KR 1020120001994 A 1/2012
KR 102123976 B1 * 6/2020 ........... H01Q 9/0421
WO WO-2011067623 A1 * 6/2011 ........... A61B 5/0507

OTHER PUBLICATIONS

Notice of Allowance dated Jul. 24, 2023 of KR Application No. 10-2022-0012481 (6 pages).

* cited by examiner

*Primary Examiner* — Robert W Hodge
*Assistant Examiner* — Bongani Jabulani Mashele
(74) *Attorney, Agent, or Firm* — Morgan, Lewis & Bockius LLP

(57) ABSTRACT

A phased array antenna with a high impedance surface according to an embodiment of the present disclosure is a phased array antenna with a high impedance surface including a plurality of unit elements, and each of the plurality of unit elements includes a substrate, a partial ground plane formed at least partially on the substrate, a planar inverted-L radiator disposed on the partial ground plane, and a via wall integrated in parallel on both edges of the partial ground plane, and a one-dimensional electromagnetic bandgap (EBG) structure is embedded in an edge of the planar radiator side of the partial ground plane.

7 Claims, 43 Drawing Sheets

<Connector-to-CPWG transition> <CPWG-to-antenna transition>

<Boresight direction (+y)> <-60° beam steering (θ = 30° )> <60° beam steering (θ = 150° )>

<Ant. for boresight (Sample A)>

<Ant. for -60° beam steering (Sample B)>

<Ant. for +60° beam steering (Sample C)>

FIG. 17

TABLE I
Comparison with the State-of-the-Art Horizontally Polarized End-Fire UE Antennas in mm-wave Spectrum

| Ref. | Antenna type (array configuration) | | Fabrication process | Dielectric constant, Loss tangent | Vol ($\lambda_0^3$) | Impedance bandwidth @ VSWR≤2.5:1 | 3 dB beam scan range @ operating frequency |
|---|---|---|---|---|---|---|---|
| [A] | Mesh-grid patch without balun (8-elements conformal) | | HDI PCB* (FR-4) | 3.92, 0.027 | 0.124 (0.19×3.83×0.170) | 12.7% (59-67 GHz) | -80°-0° @ 61 GHz** |
| [B] | Parallel strip feed to the differential dipole (8-elements linear) | | Single-layer PCB (Rogers RO5880) | 2.2, 0.0009 | 0.057 (0.47×4.16×0.029) | 26.1% (20-26 GHz) | -50°-0° @ 22 GHz**, -45°-0° @ 24 GHz** |
| [C] | Angle-dipole with balun (8-elements linear) | | Single-layer PCB (Rogers RO5880) | 2.2, 0.0009 | 0.073 (0.66×4.08×0.027) | 50% (24-40 GHz) | -45°-0° @ 28 GHz**, -40°-0° @ 32 GHz** |
| [D] | Cavity-backed dipole with balun (4-elements linear) | | Multi-layer PCB* (Rogers RO5880) | 2.2, 0.0009 | 4.325 (1.67×5.52×0.670) | 24% (22-28 GHz) | N/A (boresight) |
| [E] | Differentially fed dipole without balun (8-elements linear) | | Multi-layer PCB* (Taconic RF-30) | 3, 0.0014 | 0.131 (0.20×4.08×0.161) | 21.4% (25-31 GHz) | -60°~+60° @ 25, 27, 29, 31, 33 GHz |
| [F] | Tightly coupled dipole with balun (8-elements linear) | | Multi-layer PCB* (Taconic RF-35) | 3.5, 0.0018 | 0.162 (0.94×3.57×0.049) | 54.5% (20-35 GHz) | -30°-0° @ 24 GHz**, -27°-0° @ 28 GHz** |
| This work | ILA with 1-D EBG and via wall without balun | 4-elements linear | Single-layer PCB (FR-4) | 4.4, 0.032 | 0.014 (0.22×1.48×0.041) | 58.1% (22-40 GHz) | -60°~+60° @ 28 GHz. |
| | | 8-elements linear | | | 0.031 (0.23×3.12×0.044) | 42.4% (26-40 GHz) | -60°~+60° @ 26, 28, 30, 32 GHz, -55°~+55° @ 34, 36 GHz |

* Additional fabrication process means the integration method to realize antenna-in-package such as HDI PCB and adhesive layer.
** The 3 dB beam scan range in the reference paper are reported about the measured results in only half space.

PHASED ARRAY ANTENNA WITH HIGH IMPEDANCE SURFACE

CROSS-REFERENCE TO RELATED APPLICATIONS

This application claims benefit of priority to Korean Patent Applications No. 10-2021-0159784 filed on 18 Nov. 2021 and No. 10-2022-0012481 filed on 27 Jan. 2022 in the Korean Intellectual Property Office, the disclosure of which is incorporated herein by reference in its entirety.

BACKGROUND OF THE DISCLOSURE

Field of the Disclosure

The present disclosure relates to a phased array antenna with a high impedance surface, and more particularly, to a phased array antenna with a high impedance surface based on a single-layer FR-4 PCB process.

Related Art

As a related art, a small antenna device capable of providing broadband and high gain characteristics in a horizontal polarization in an end-fire direction without any auxiliary circuit as a one-dimensional electromagnetic bandgap (hereinafter referred to as an EBG) grounding structure with high impedance surface characteristics that exhibits a slow wave behavior in a dual directions (capable of surface wave and plane wave control) is included in an inverted-L antenna (hereinafter referred to as ILA) has been devised. Since the antenna device does not require any auxiliary circuit, the antenna device can be utilized for a unit element of a compact array antenna even on a material platform for various radio wave extreme environments (for example, an antenna with a thin-film display, a single-layer FR-4 PCB process-based antenna, or an on-chip antenna). Recently, when an antenna and a circuit system are implemented using a multi-band technology, a multi-band filter and a RF switch are essential. The multi-band filter and the RF switch cause the unintended insertion loss and group delay accumulation, and control of these elements increases DC power consumption in the entire systems. Moreover, a multi-band design method is not more difficult than a broadband antenna technology in terms of antenna implementation difficulty. Therefore, since the multi-band leads to degraded system performance, a broadband antenna and beam-forming circuit technology is preferred.

However, a one-dimensional EBG unit cell having an operating frequency 10 or more times higher than that in the related art by utilizing the same single-layer FR-4 PCB process (½ Oz. Minimum line width of electrode thickness design: 100 μm) has not been yet designed, and an antenna that can be driven with a high impedance surface has not been studied.

Meanwhile, even when technology for an ILA unit element with a one-dimensional EBG structure of the related art is applied to an array antenna, a high impedance surface design technology between adjacent antenna elements has not been yet applied. In this design technology, the high impedance surface can suppress a mutual coupling path caused by a surface current flowing through a common ground plane between adjacent elements.

SUMMARY OF THE DISCLOSURE

An object of the present disclosure is to provide a phased array antenna with broadband characteristics in which a surface current flowing through a common ground plane among two mutual coupling paths between array antenna elements is suppressed.

Another object of the present disclosure is to provide a phased array antenna capable of being applied to a millimeter wave 5G terminal antenna that can support cost-effective global roaming service, and of achieving a spherical coverage without any shadow region in a broadband.

However, the problems to be solved by the present disclosure are not limited thereto, and may be variously extended without departing from the spirit and scope of the present disclosure.

According to an aspect of the present disclosure, a phased array antenna with a high impedance surface, the phased array antenna including: a plurality of unit elements, wherein each of the plurality of unit elements includes a substrate; a partial ground plane formed at least partially on the substrate; a planar inverted-L radiator disposed on the partial ground plane; and a via wall integrated in parallel on both edges of the partial ground plane, and a one-dimensional electromagnetic bandgap (EBG) structure is embedded in an edge of the planar radiator side of the partial ground plane is provided.

According to an aspect, the plurality of unit elements may be linearly arrayed within $0.39\lambda_0$, $\lambda_0$ being a wavelength in a free space.

According to an aspect, the one-dimensional EBG structure may include a plurality of periodic unit cells, and the plurality of periodic unit cells may be arrayed in a line at the edge of the planar radiator side of the partial ground plane.

According to an aspect, the plurality of periodic unit cells configured in the one-dimensional EBG structure may include a meander strip line utilizing a single-layer FR-4 PCB process.

According to an aspect, the one-dimensional EBG structure may be configured to operate as a high impedance surface having a slower wave behavior to be able to exhibit quadratic reflection phase than an antenna without a one-dimensional EBG structure.

According to an aspect, the phased array antenna is configured to operate as a high impedance surface having a slower wave behavior than an antenna without a one-dimensional EBG structure in a horizontal direction of an edge of the one-dimensional EBG structure so that surface wave control is able to be performed.

According to an aspect, the phased array antenna may have a structure in which a one-dimensional EBG structure and an inverted-L antenna unit element are integrated, and a mutual coupling path between the antenna unit elements caused by a surface current flowing through a common ground plane can be suppressed due to high impedance surface characteristics of the via wall, compared to a linearly arrayed phased array antenna without the via wall.

According to an aspect, the phased array antenna may further include: a feeding network configured of a coplanar waveguide with ground (CPWG) transmission line including a plurality of island-shaped via walls serving as a high impedance surface for reducing leakage power.

According to an aspect, the phased array antenna may further include: a power distribution circuit, the power distribution circuit including a tapered T-shaped power divider to facilitate impedance matching and low loss feeding despite a constraint of electrode manufacturing resolution in single-layer FR-4 PCB process.

According to an aspect, the phased array antenna may include a high impedance surface instead of a Balun, the Balun being an auxiliary circuit, such that wide-angle beam steering is allowed in a broadband and spherical coverage characteristics are provided, despite utilization of a single-layer FR-4 PCB process.

The disclosed technology can have the following effects. However, since this does not mean that a specific embodiment should include all of the following effects or should include only the following effects, the scope of the disclosed technology should not be construed as being limited thereby.

According to the phased array antenna with a high impedance surface according to the embodiment of the present disclosure described above, a design and verification method for a millimeter wave phased array antenna utilizing a high impedance surface (a one-dimensional EBG and a via wall) structure and an ILA integrated into an antenna unit element in a single-layer FR-4 PCB substrate is presented. In the present disclosure, the via wall that is a high impedance surface structure is inserted in order to suppress a surface current flowing through the common ground plane among two mutual coupling paths between the array antenna elements. As a result, it was confirmed that an antenna including a structure of the one-dimensional EBG and the via wall had broader-band impedance characteristics. More specifically, it was confirmed that a maximum of 16.6% EVM characteristics satisfy 3GPP standard requirements as a result of OTA testing for each of beam steering angles (90° and) 90±60° utilizing four phased array antennas including the proposed antenna type, and a commercial beamforming chipset. Furthermore, three types of 1×8 power dividers with phase delay characteristics and eight phased array antennas were manufactured and simulated, and radiation performance was verified, in order to confirm the applicability of a millimeter wave 5G terminal antenna capable of supporting a global roaming service. As a result, in the present disclosure, a spherical coverage is achieved without a large shadow area in a broadband despite being on an cost-effective single-layer FR-4 PCB process. Therefore, with the proposed antenna, it is possible to provide a millimeter wave 5G roaming service in a terminal.

BRIEF DESCRIPTION OF THE DRAWINGS

FIG. 17 illustrates a table showing a comparison of performance between horizontally polarized end-fire radiation millimeter wave antennas for a terminal in the related art.

DESCRIPTION OF EXEMPLARY EMBODIMENTS

Figure 1:
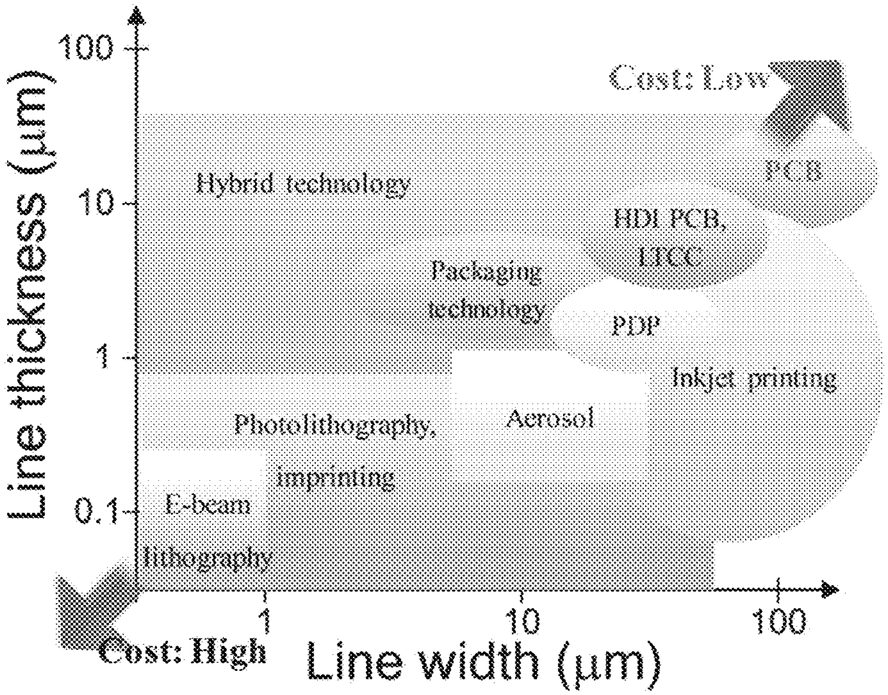
FIG. 1 illustrates various printing and packaging process techniques that are utilized in millimeter wave antennas considering relation between fabrication cost and electrode manufacturing resolution.

Various changes may be made to the present disclosure, there are several embodiments of the present disclosure, and specific embodiments will be illustrated in the drawings and described in detail.

However, this is not intended to limit the present disclosure to the specific embodiments, and it should be understood that all changes, equivalents, or substitutions included in the spirit and scope of the present disclosure are included.

Although the terms first, second, etc. may be used to describe various components, these components should not be limited by these terms. The terms are only used to distinguish one component from other components. For example, a first component could be termed a second component and, similarly, a second component could be termed a first component without departing from the scope of the present disclosure.

It will be understood that when a component is referred to as being "connected" or "coupled" to another component, the component may be directly connected or coupled to the other component or intervening elements may be present. On the other hand, when a component is referred to as being "directly connected" or "directly coupled" to another component, there are no intervening elements present.

The terminology used herein is only used for the purpose of describing specific embodiments and is not intended to limit the present disclosure. Singular forms "a," "an" and "the" include plural forms unless the context clearly indicates otherwise. It will be further understood that terms "include", "have", etc. used herein designate the presence of features, integers, steps, operations, components, parts, or combinations thereof, but do not preclude a likelihood of the presence or addition of one or more other features, integers, steps, operations, components, parts, and/or combinations thereof.

Unless otherwise defined, all terms used herein, including technical and scientific terms, have the same meaning as commonly understood by those skilled in the art to which the present disclosure belongs. Terms such as those defined in commonly used dictionaries should be construed as having meanings consistent with their meaning in the context of the relevant art and will not be construed as having idealized or overly formal meanings unless expressly defined herein.

Hereinafter, preferred embodiments of the present disclosure will be described clearly and in detail with reference to the accompanying drawings so that those skilled in the art to which the present disclosure pertains can easily implement the present disclosure.

FIG. 1 illustrates various printing and packaging process techniques that are utilized in millimeter wave antennas. Electrode resolution of such process technologies is a key factor in a process unit cost and an operating frequency of an antenna and, in particular, in the case of a one-dimensional EBG structure, a unit cell design should be as an one-dimensional periodic structure with a sub-wavelength size. Therefore, it is very difficult to implement, in a cost-effective single-layer PCB process, a one-dimensional EBG unit cell with high impedance surface characteristics, a periodic structure, and an antenna including the same at an operating frequency 10 times higher than that in the related art (for example, an antenna with a one-dimensional EBG structure) is operated in a low frequency band of 2.7 GHz or less. Further, the single-layer FR-4 PCB can serve as an accelerant for millimeter wave 5G acceleration due to an ultra-low manufacturing cost of ⅓ to ⅕ or less compared to other PCBs, but has not been utilized due to a large dielectric loss (0.032 @ 28 GHz) in a millimeter wave spectrum. Nevertheless, in the present disclosure, a phased array antenna including a high impedance structure (a one-dimensional EBG and a via wall) for implementation of an ultra-small and ultra-thin antenna with low mutual coupling characteristics (an inter-element spacing: $0.39\lambda_0$, where $\lambda_0$ is a wavelength in a free space) has been devised in order to achieve a broadband and a spherical coverage in a millimeter wave band as well as an economical production cost.

Figure 2A:
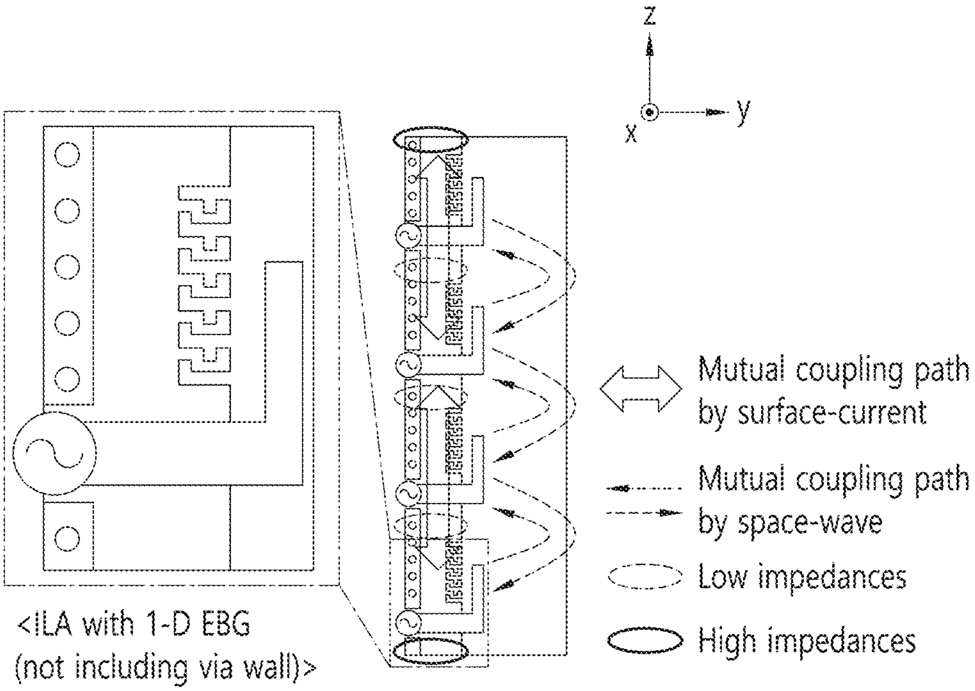
FIGS. 2A and 2B illustrate a structure of a unit element constituting a phased array antenna with a high impedance surface according to an embodiment of the present disclosure and a structure of an antenna according to the related art.
Figure 2B:
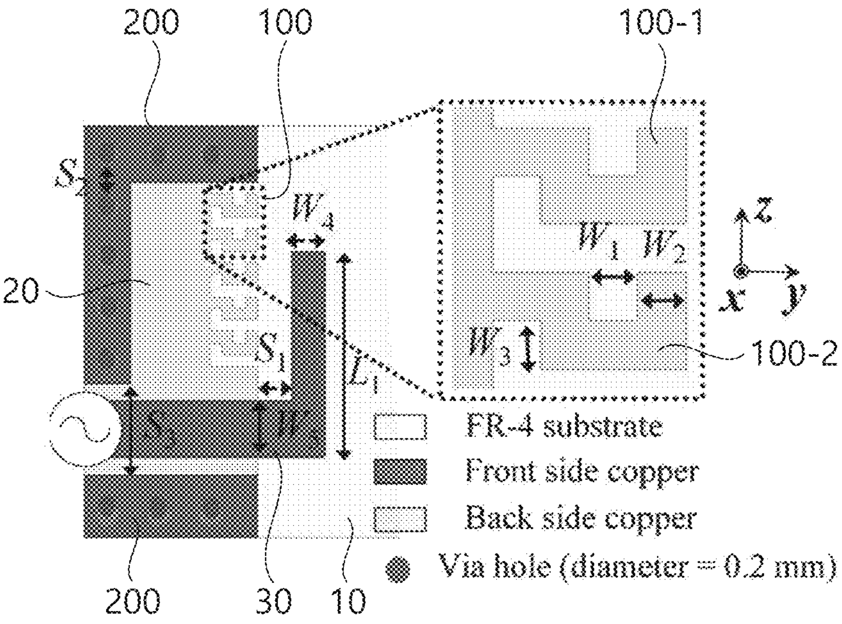

FIGS. 2A and 2B illustrate a structure of an antenna according to the related art and a structure of a unit element constituting the phased array antenna with a high impedance surface according to the embodiment of the present disclosure.

Referring to FIG. 2A, two main mutual coupling paths of a multi-antenna (for example, a massive MIMO antenna or an array antenna) appear when respective antenna elements are densely arrayed at an inter-element spacing within $0.5\lambda_0$. One of the mutual coupling paths is an coupling path caused by space waves that may exist in a substrate dielectric or a free space, and the other is an coupling path caused by a surface current of a common ground plane. In the case of a single-antenna element with a one-dimensional EBG structure, a high impedance surface of a ground plane edge is converted to a low impedance surface when arrayed as a multi-antenna, which becomes a mutual coupling path caused by a strong surface current.

Referring to FIG. 2B, the phased array antenna with a high impedance surface according to the embodiment of the present disclosure is configured in the form of an ILA including a one-dimensional EBG structure 100 and a via wall 200. Specifically, each of unit elements constituting the phased array antenna with a high impedance surface according to the embodiment of the present disclosure may include a substrate 10, a partial ground plane 20 formed at least partially on the substrate 10, a planar inverted-L radiator 30 disposed on the partial ground plane 10, and the via wall 200 integrated in parallel at both edges of the partial ground plane 20. Here, the one-dimensional EBG structure 100 may be embedded in an edge of the planar radiator 30 side of the partial ground plane 20. The plurality of unit elements may be linearly arrayed within $0.39\lambda_0$. For example, in FIG. 2B, a size of the unit element may be 0.4 mm×2.1 mm×3.6 mm, may be $W_1$=0.1 mm, $W_2$=0.1 mm, $W_3$=0.1 mm, $W_4$=0.3 mm, $W_5$=0.5 mm, $L_1$=1.8 mm, $S_1$=0.3 mm, $S_2$=0.25 mm, and $S_3$=0.8 mm.

With the phased array antenna with a high impedance surface according to the embodiment of the present disclosure, it is possible to suppress an coupling path caused by a surface current by integrating the via wall 200 in parallel on both the edges of the partial ground plane 20 of the antenna unit element, and to provide an effect of self-decoupling between the antenna elements. When a plurality of antenna unit elements are vertically connected, the via wall 200 may be integrated in parallel at upper and lower edges of the partial ground plane 20. Further, the one-dimensional EBG structure 100 may include a plurality of periodic unit cells 100-1 and 100-2, and the plurality of periodic unit cells 100-1 and 100-2 may be arrayed in a line at the edge of the partial ground plane 20 on the planar radiator 30 side. The unit cells 100-1 and 100-2 can be configured of a meander strip line according to an FR-4 (a dielectric constant of 4.4 and a loss factor of 0.032@28 GHz) PCB design rule (a minimum line width of 100 μm) that is a manufacturing resolution limit, and five the unit cells may be arrayed in a row in the partial ground plane 20.

Figure 3:
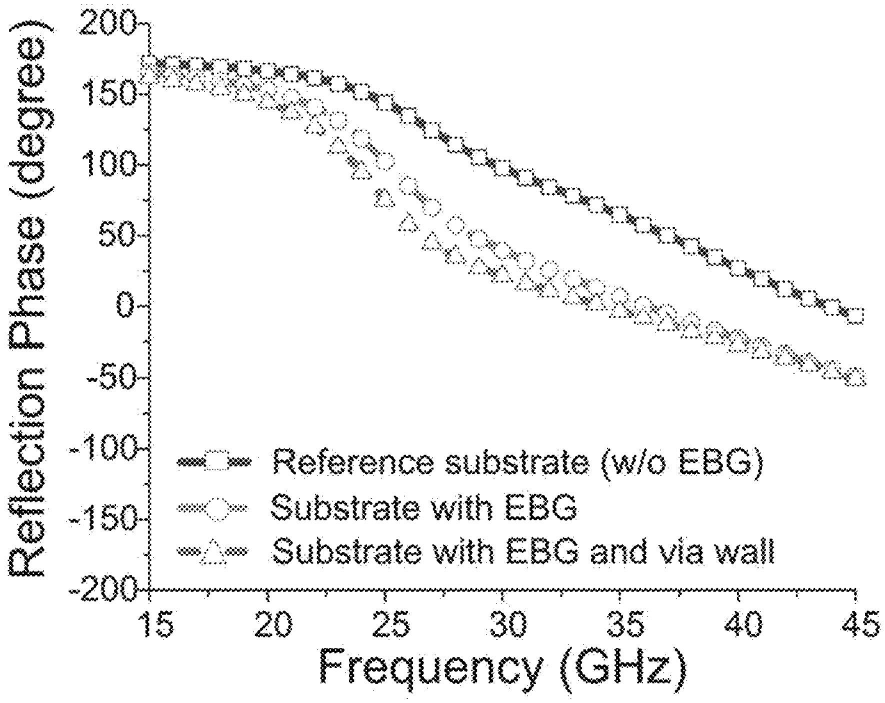
FIG. 3 illustrates a reflection phase of an FR-4 substrate with an partially grounded plane.

FIG. 3 illustrates a reflection phase of an FR-4 substrate with an integrated partial ground plane.

As illustrated in FIG. 3, a reflection phase of a substrate including both the one-dimensional EBG structure 100 and the via wall 200 exhibits a relatively steep change in phase compared to other substrates despite the same antenna size. When the reflection phase of the substrate including both the one-dimensional EBG structure 100 and the via wall 200 ranges from 135° to 0°, it can be seen that an input impedance matching frequency band ranges from 23 GHz to 34 GHz.

Figure 4A:
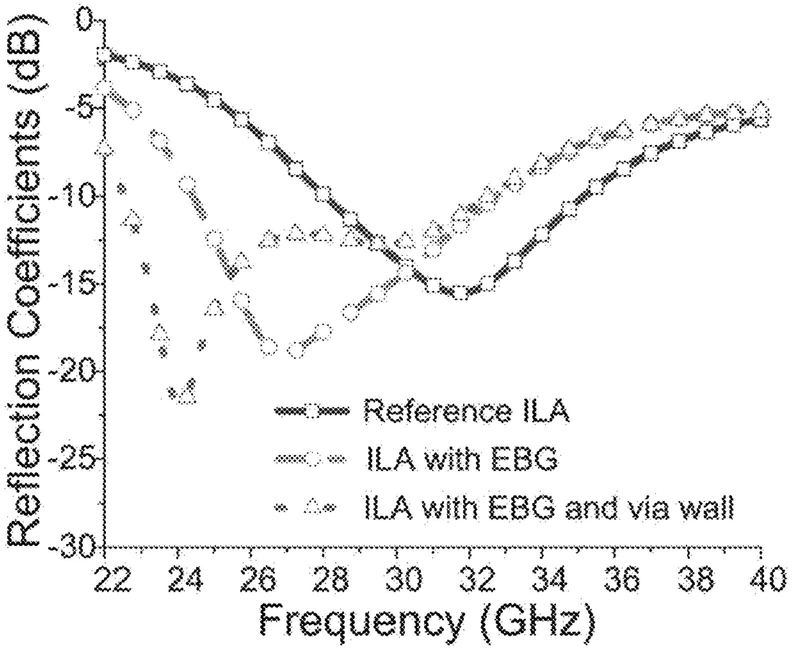
FIGS. 4A and 4B illustrate simulated performance of three antenna unit elements.
Figure 4B:
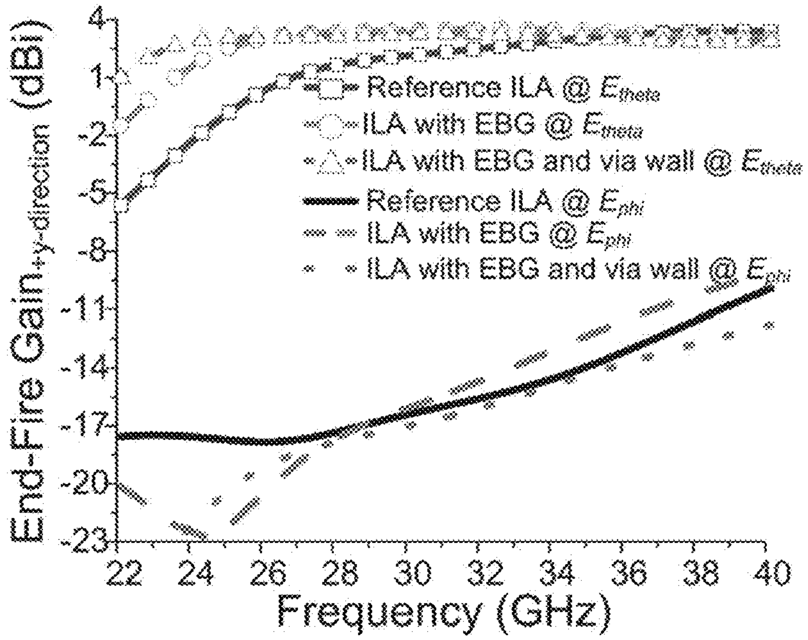

FIGS. 4A and 4B illustrate simulated performance of three antenna unit elements.

An electrical length of the unit element (ILA with an EBG and a via wall) of the phased array antenna with a high impedance surface according to the embodiment of the present disclosure is further compressed as compared to other antennas, as represented by a lowest input impedance matching frequency within the same distance between the elements. It is expected that an ILA topology with the one-dimensional EBG structure 100 and the via wall 200 will achieve a high gain in a longitudinal direction in a horizontal polarization without separate performance degradation despite a further electrically compressed configuration.

FIGS. 5A to 5D illustrate a phased array antenna in which four unit elements each designed using ideal feed ports.

Figure 5A:
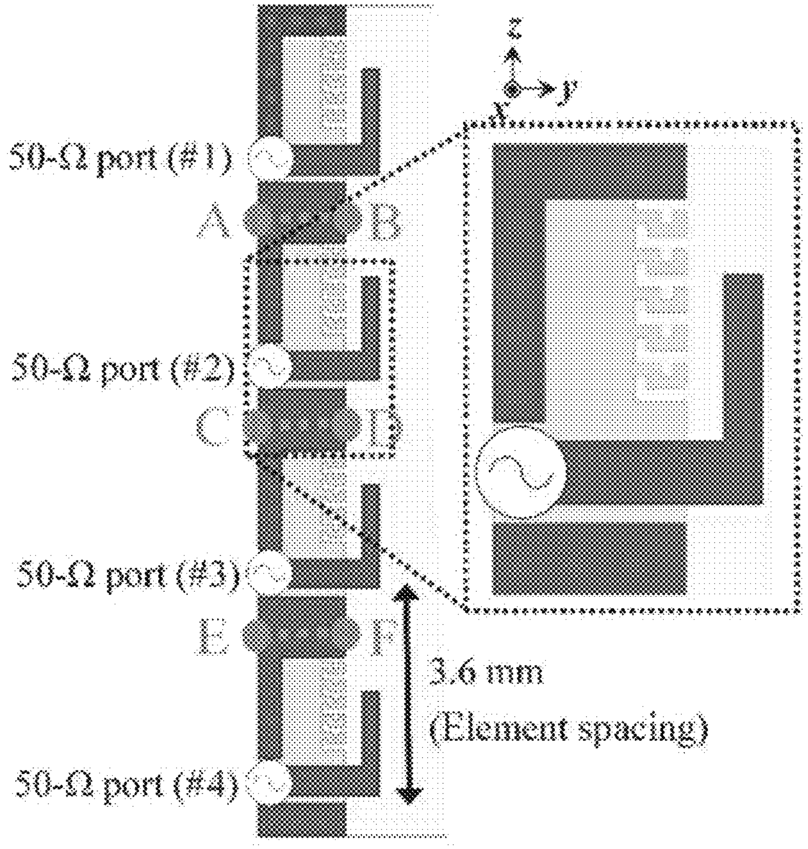
FIGS. 5A to 5D illustrate a 4-element array antenna design utilizing as an ideal feed port.
Figure 5B:
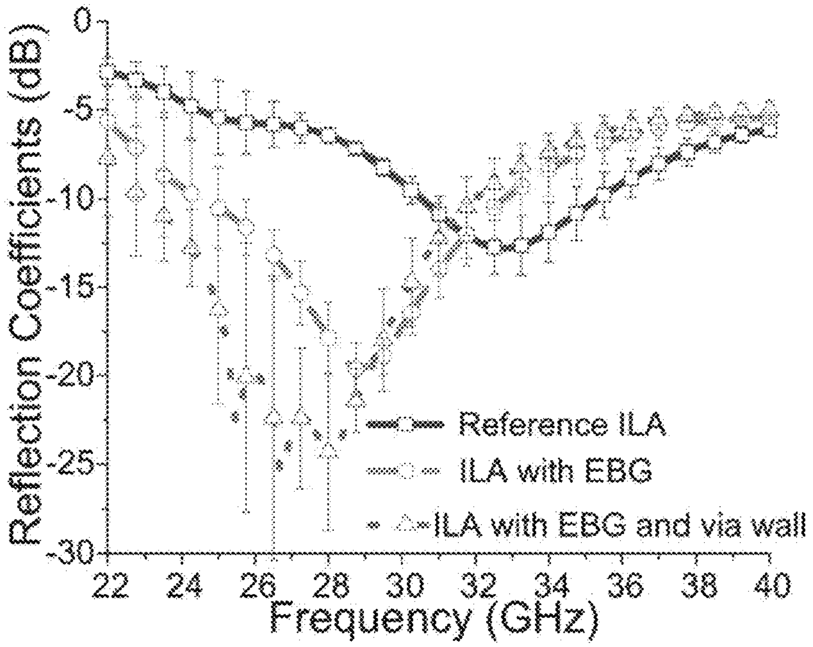
Figure 5C:
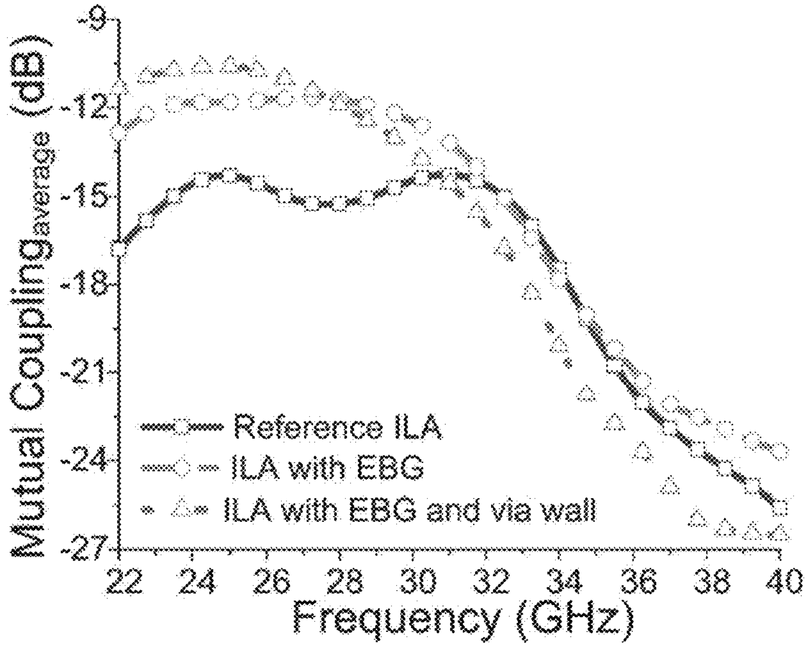
Figure 5D:
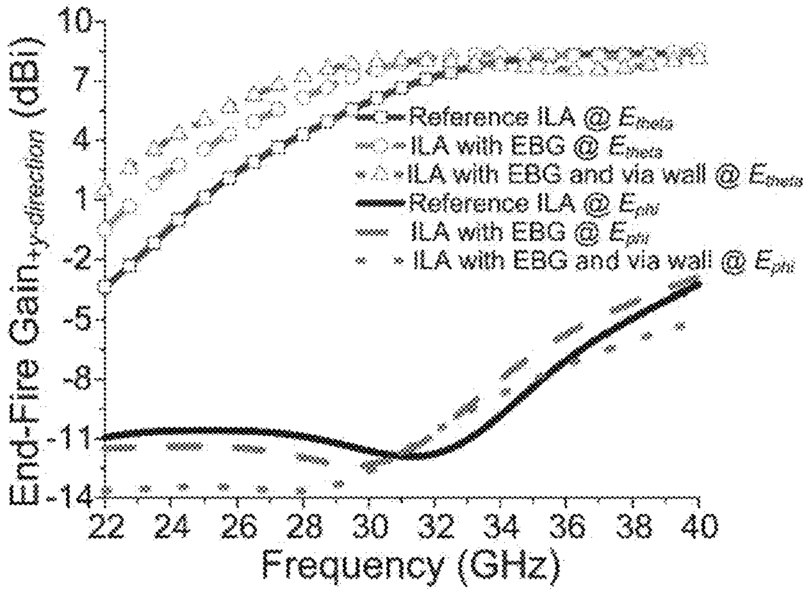

Referring to FIG. 5A, 4-element phased array antennas with an activated ideal in-phase 50Ω port are densely arrayed within an inter-element spacing of $0.39\lambda_0$ (3.6 mm). When the ILA element together with the one-dimensional EBG structure 100 and the via wall 200 was used as illustrated in FIG. 5C, an average mutual coupling of less than −10 dB was achieved in the phased array antenna despite a small inter-element spacing. Further, FIGS. 5B and 5D show that, with the 4-element phased array antenna, it is possible to obtain a high end-fire gain and low cross-polarization radiation energy within a band of 23 GHz to 31 GHz in which an input impedance of −10 dB or less is satisfied.

Figure 6A:
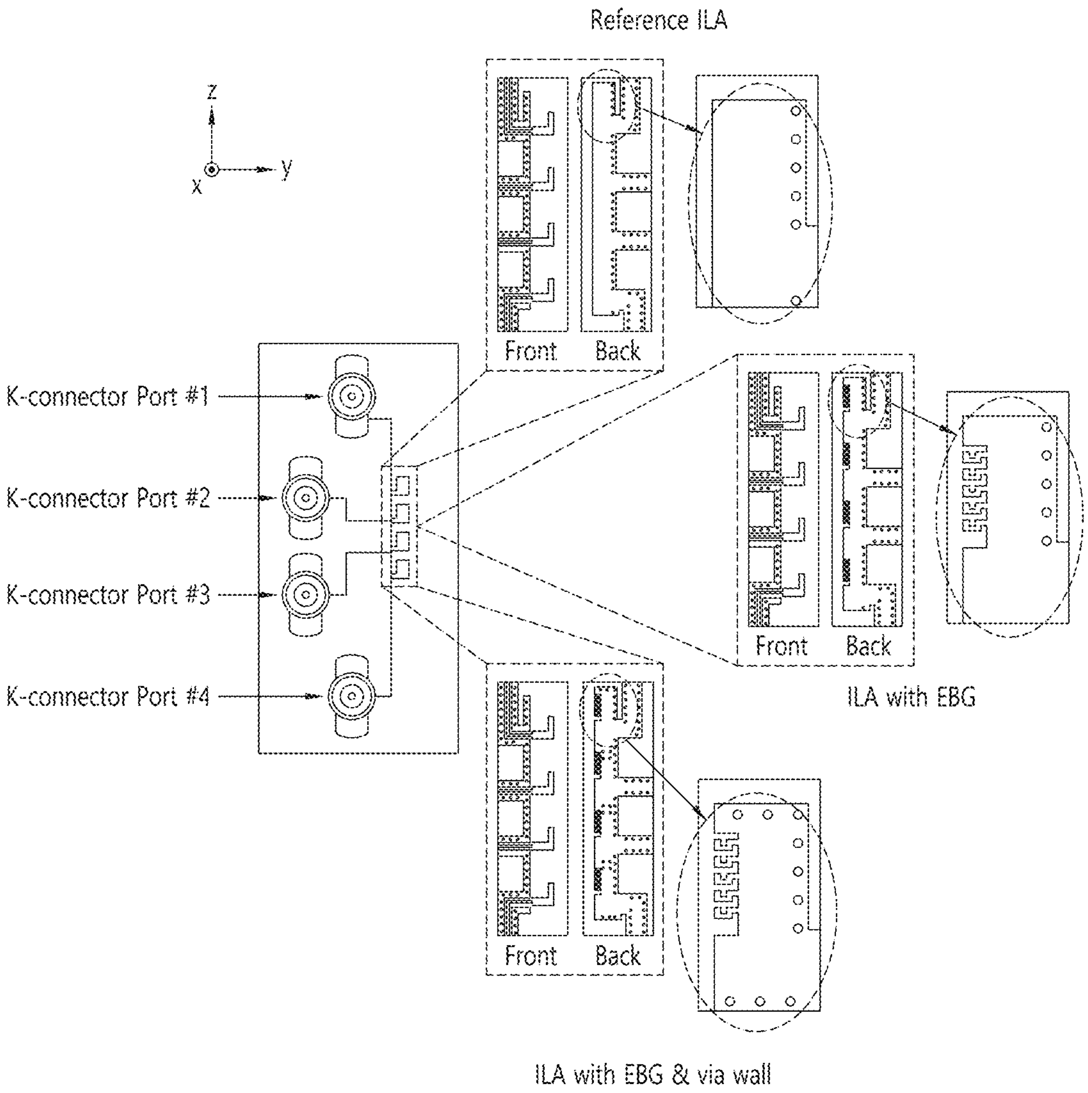
FIGS. 6A and 6B illustrate samples of three types of phased array antennas manufactured to include the same feeding network.
Figure 6B:
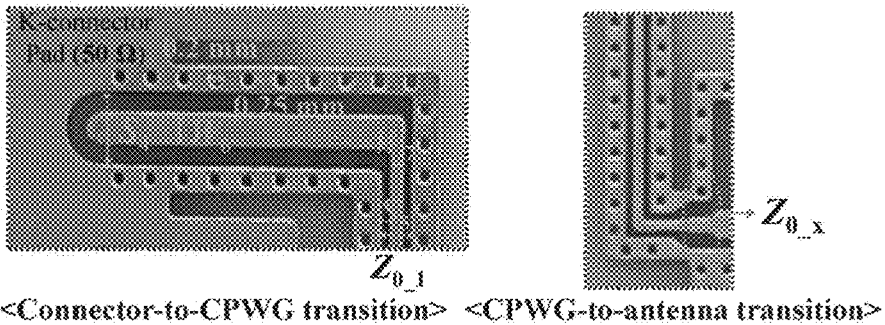
Figure 7A:
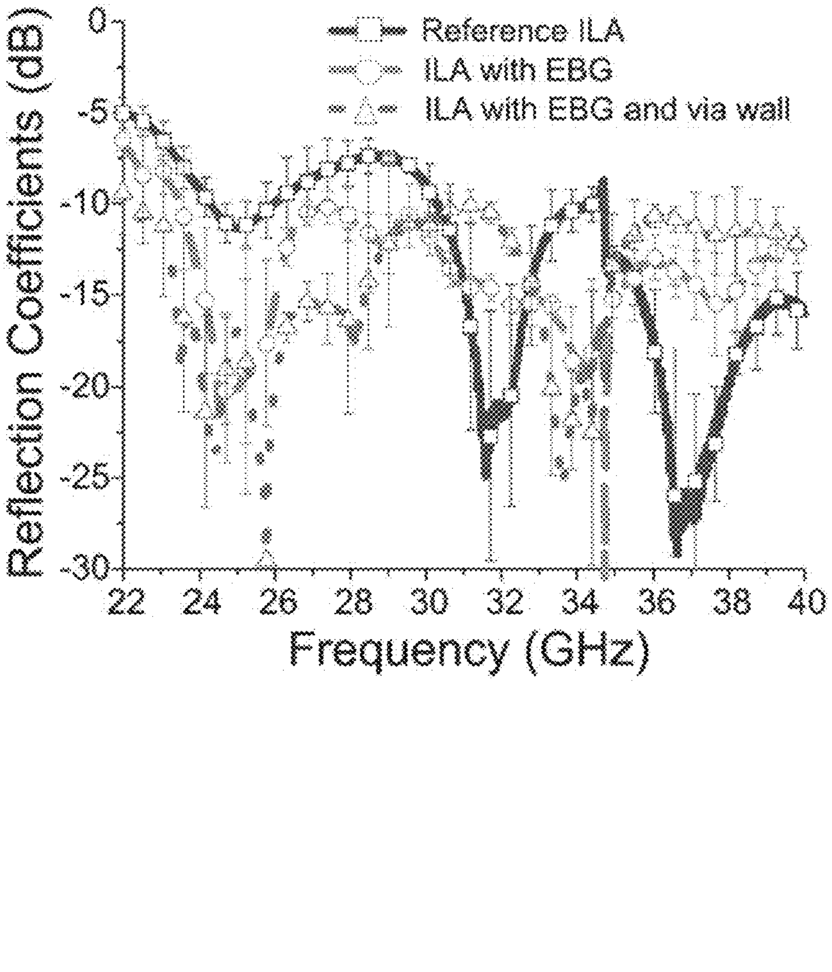
FIGS. 7A to 7D illustrate measurement results of three types of manufactured 4-element array antennas.
Figure 7B:
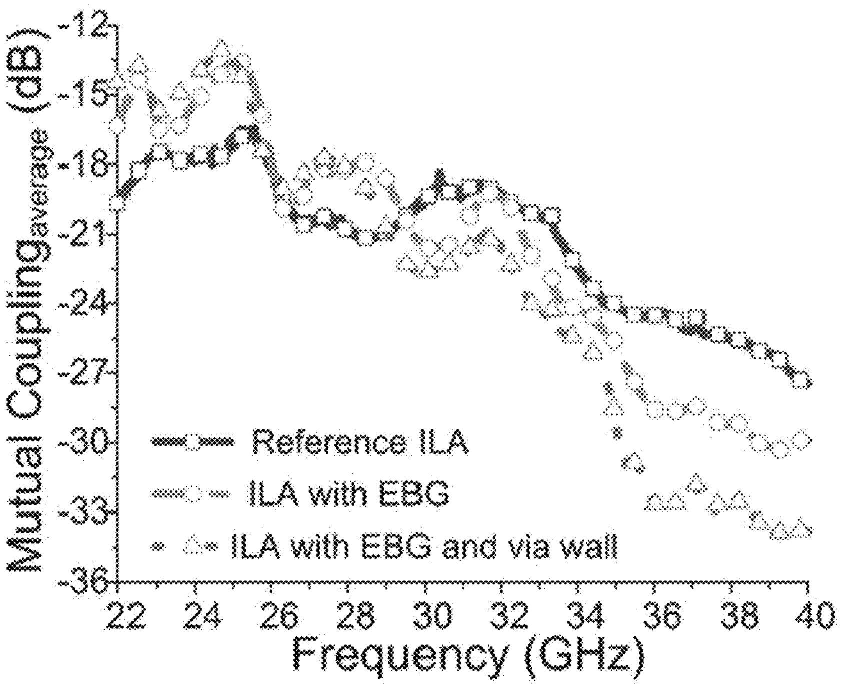
Figure 7C:
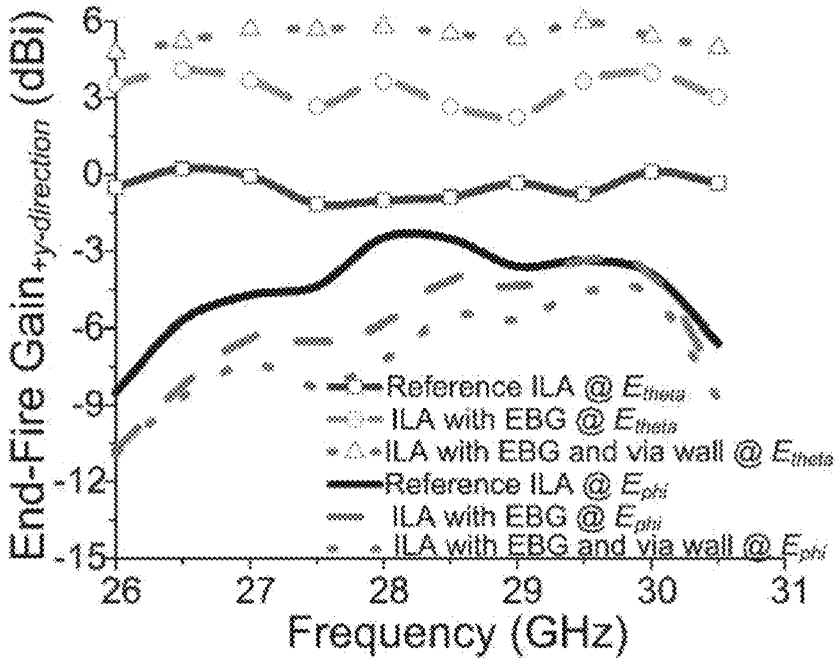
Figure 7D:
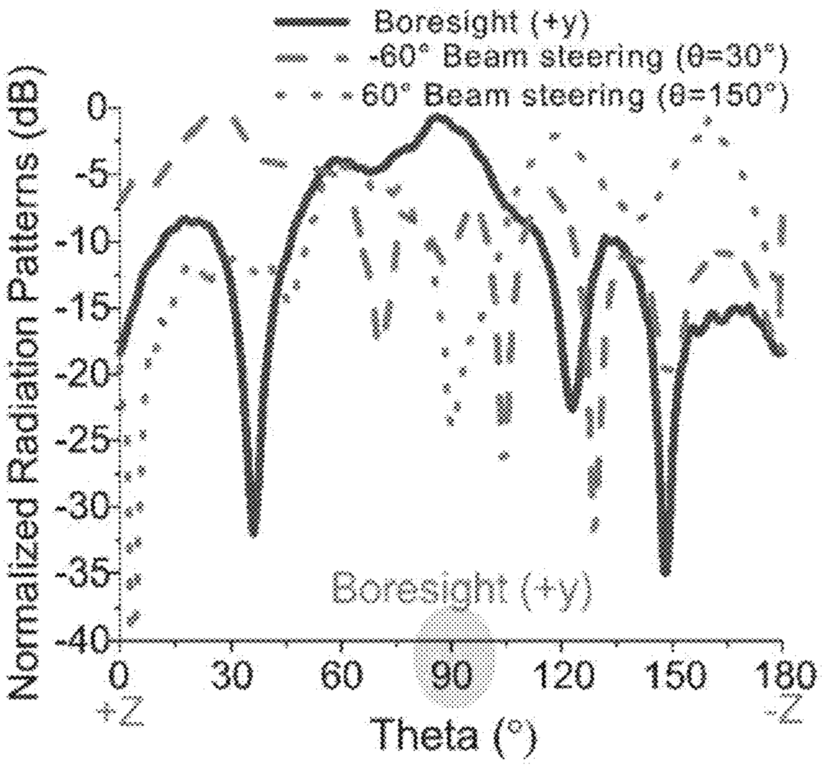

FIGS. 6A and 6B illustrate samples of three types of phased array antennas manufactured to include the same feeding network.

The phased array antenna according to the embodiment of the present disclosure may further include a feeding network having a low leakage power loss and excellent impedance matching characteristics to individually supply in-phase power. As illustrated in FIGS. 6A and 6B, the feeding network may be configured of a coplanar waveguide with ground (CPWG) transmission line including a plurality of island-shaped via walls serving as high impedance surfaces in an FR-4 substrate. For example, $W_6$=0.6 mm, $W_7$=0.2 mm, $S_4$=1.0 mm, $S_5$=0.4 mm, $Z_{0\_1}$=65Ω, and $Z_{0\_x}$=60Ω. In order to obtain excellent radiation efficiency as well as impedance matching, a characteristic impedance of the feeding network can be designed to be close to 50Ω in a small size under a condition that a PCB design rule is satisfied. A small 4-element phased array antenna was manufactured by utilizing a feeding network and three types of designed antennas.

FIGS. 7A to 7D illustrate measurement results of three types of manufactured 4-element phased array antennas.

With a phased array antenna in which an ILA and a high impedance structure (a one-dimensional EBG and a via wall) are integrated, a wide impedance bandwidth of 18 GHz was obtained between 22 GHz and 40 GHz. An average value of the mutual coupling of this antenna was suppressed to less than −12 dB. It was experimentally verified that, when in-phase feeding was made using a commercial RFIC beamforming chipset, a end-fire radiation gain of 6 dBi and a lower cross-polarization than a main polarization of 12 dB in an end-fire direction at 28 GHz were realized with the antenna. Further, with an antenna including an ILA topology with a high impedance surface structure (a one-dimensional EBG and a via wall), a 120° (±60°) beam coverage was secured within a 3 dB scan loss.

Figure 8A:
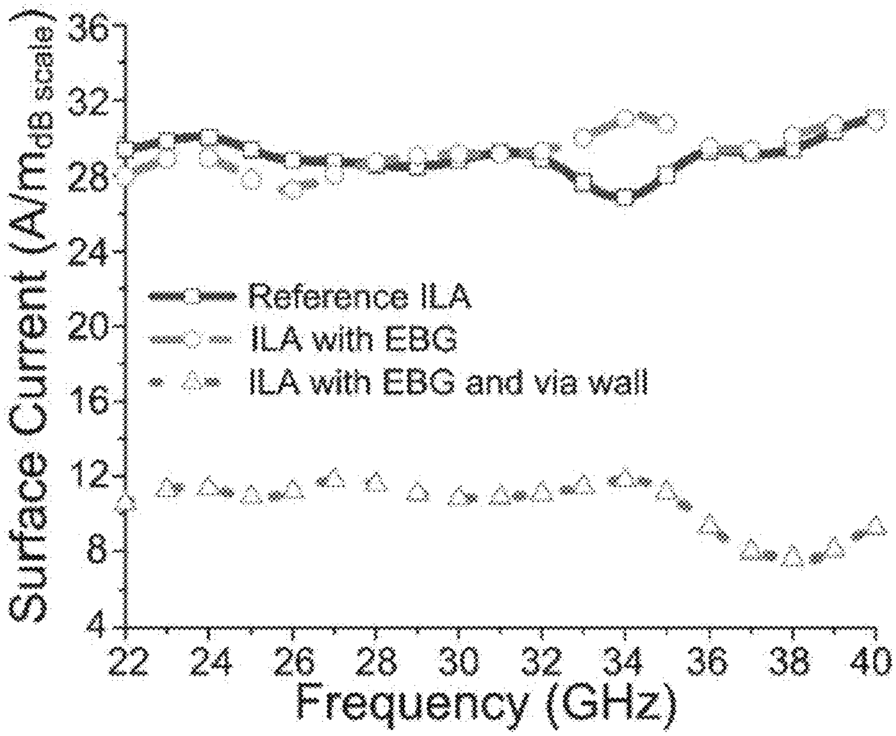
FIGS. 8A to 8C illustrate an average value of a surface current distribution with respect to a frequency for each position of a common ground plane of the three types of manufactured 4-element array antennas.
Figure 8B:
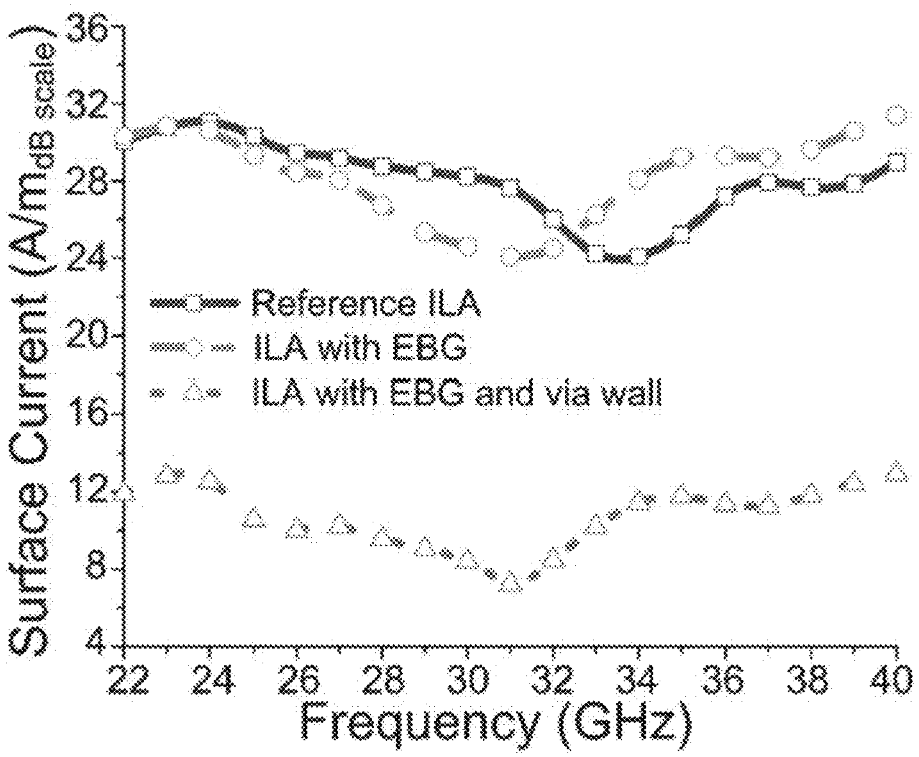
Figure 8C:
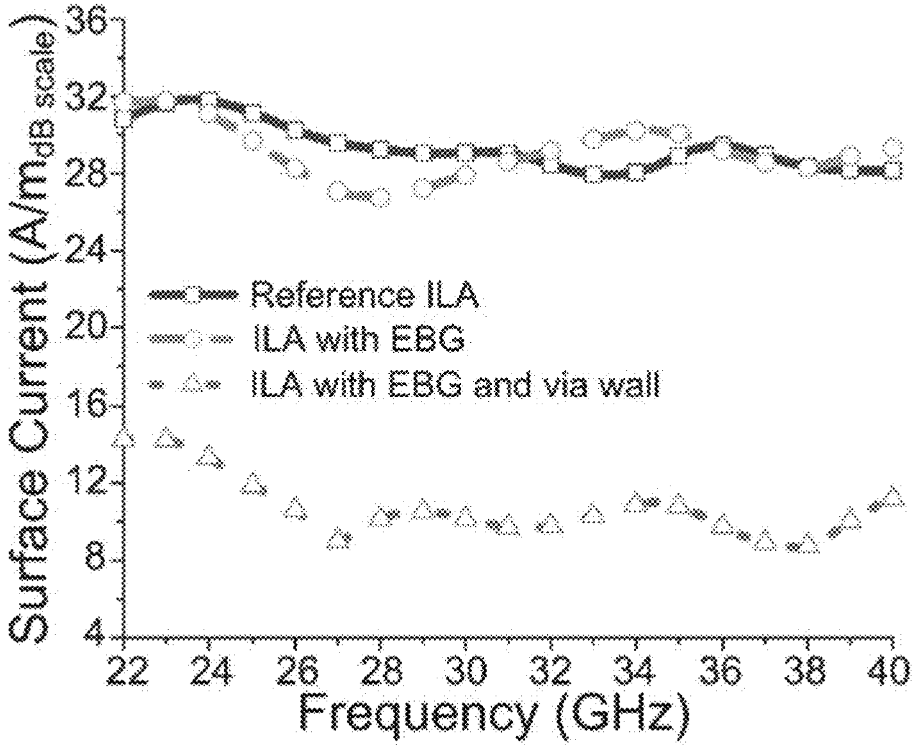

FIGS. 8A to 8C illustrate an average value of a surface current distribution with respect to a frequency for each position of a common ground plane of the three types of manufactured 4-element array antennas.

It can be seen that a surface current of the line for each virtual position of the common ground plane illustrated in FIG. 5A is greatly suppressed due to high impedance characteristics of the structure of the one-dimensional EBG and the via wall, as illustrated in FIGS. 8A to 8C. This makes it possible to suppress a mutual coupling path caused by a surface current of the common ground plane due to the high impedance surface characteristics of the via wall structure built into the antenna element.

Figure 9A:
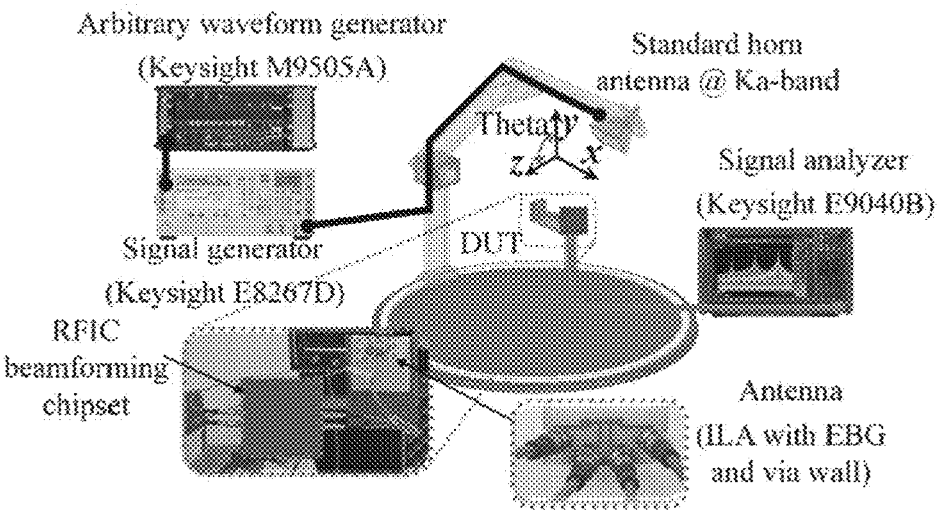
FIGS. 9A and 9B illustrate an experimental setup and experimental results for verification of OTA system performance.
Figure 9B:
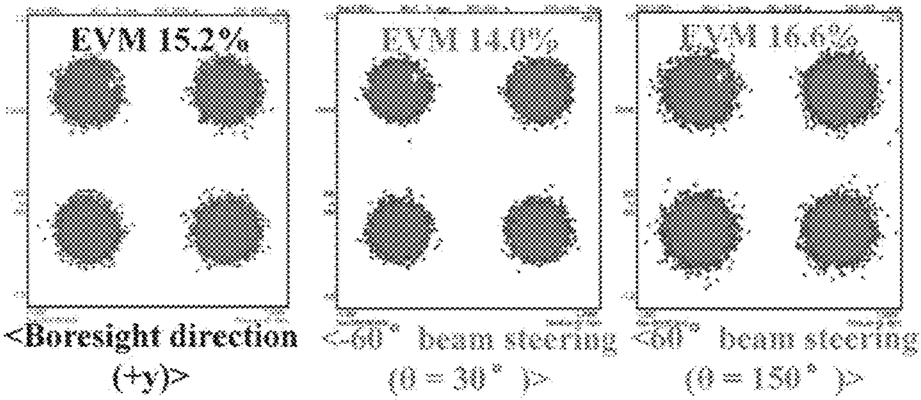

FIGS. 9A and 9B illustrate an experimental setup and experimental results for verification of OTA system performance.

It is necessary to verify that an antenna manufactured on an FR-4 substrate with high dielectric loss characteristics can wirelessly transmit a signal without nonlinear distortion in a large signal, by comparing an error vector magnitude (EVM) performance with a millimeter wave 5G standard specification. A result of measuring an OTA system performance of a phased array antenna manufactured using a commercial beamforming RFIC chipset for various scan angles was analyzed. For measurement of FIG. 9A, a 4-element phased array antenna including an ILA topology integrated with the high impedance surface (a one-dimensional EBG and a via wall) structure manufactured above was utilized. Using a QPSK modulation scheme, an OTA experiment was performed with a carrier frequency of 28 GHz and a signal bandwidth of 100 MHz. A maximum EVM was 16.6% at a scan angle of 60° due to an influence of a high side lobe level at θ=120° in FIG. 7D, as illustrated in FIG. 9B. It was verified that measured OTA performance results can also be utilized in a QPSK modulation scheme when compared to a millimeter wave 5G specification in a 3GPP standard.

A large-capacity linear phased array antenna with 8 or more elements with an increased antenna directivity and a reduced side lobe level was further studied in order to satisfy a link budget in a millimeter wave 5G terminal. However, since there is no commercial RFIC chipset capable of simultaneously controlling an 8-element array antenna, a 1×8 T-shaped power divider including a predetermined phase delay line was designed. In this case, in the antenna element, an ILA topology including a high impedance surface (a one-dimensional EBG and a via wall) structure verified above was utilized.

Figure 10A:
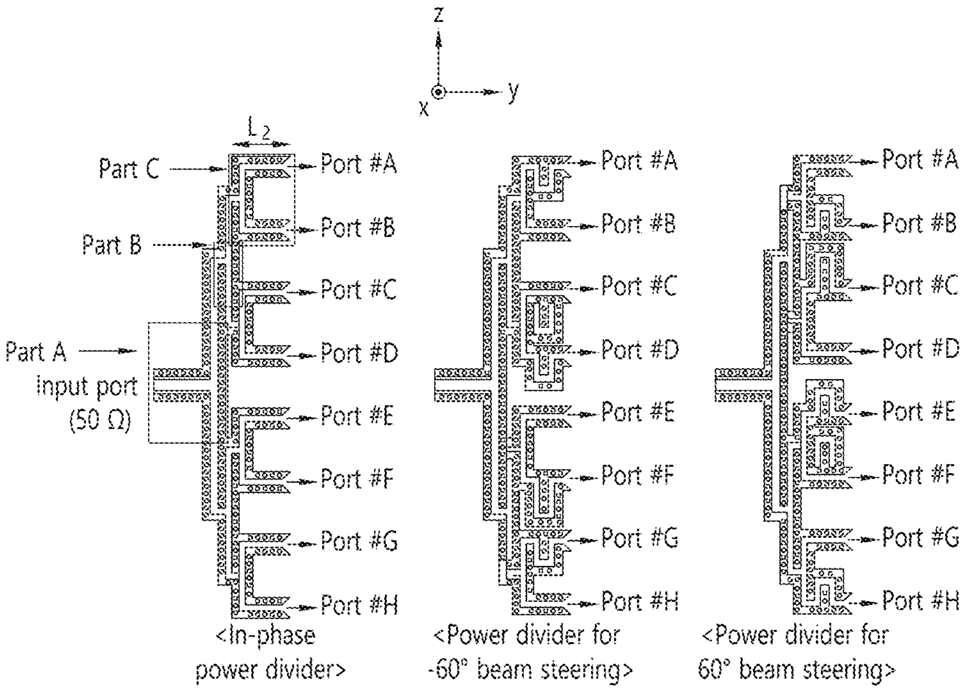
FIGS. 10A and 10B illustrate a structure of a feeding network designed for implementation of an 8-element array antenna.
Figure 10B:
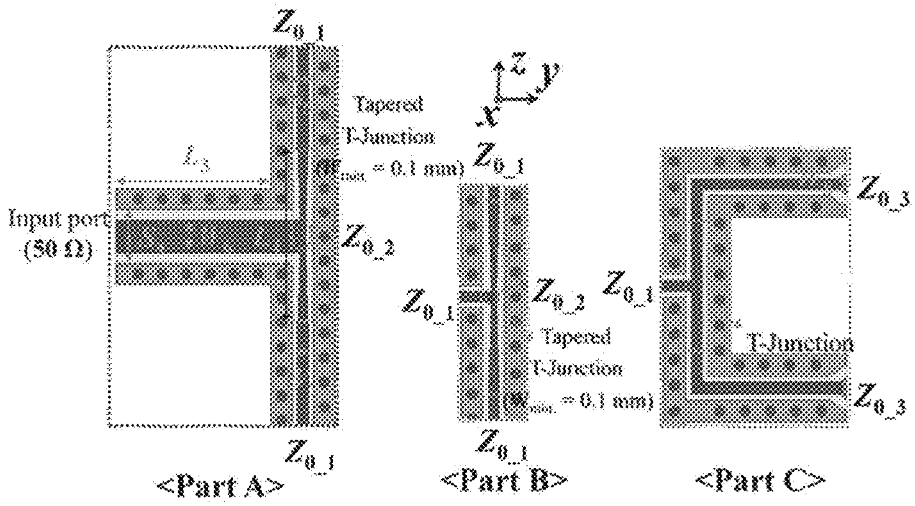

FIGS. 10A and 10B illustrate a structure of a feeding network designed for implementation of an 8-element array antenna. For example, in FIGS. 10A and 10B, $W_6$=0.5 mm, $L_2$=3.25 mm, $L_3$=2.9 mm, $L_4$=3.6 mm, $Z_{0\_2}$=91Ω, and $Z_{0\_3}$=52Ω.

In order to realize a low loss feeding network within an inter-element spacing, ground planes including a via wall structure are partially overlapped between portions of the power divider, compression patterning was performed, and the structure was designed as illustrated in FIG. 10A. In the case of an in-phase T-shaped power divider, a total length of a feeding network from an input port to an output port was reduced to 19.1 mm and the structure was designed to minimize a loss due to an FR-4 substrate material. In order to verify wide-angle coverage characteristics in a broadband, a tapered T-shaped power divider was designed as illustrated in FIG. 10B so that a wide impedance bandwidth was obtained within a PCB design specification, and a maximum characteristic impedance of a transmission line is 91Ω or less. A difference in physical length between respective adjacent antenna elements in part C is 2 mm so that a phase delay is at 120° in the T-shaped power divider for ±60° beam steering with reference to 28 GHz.

Figure 11A:
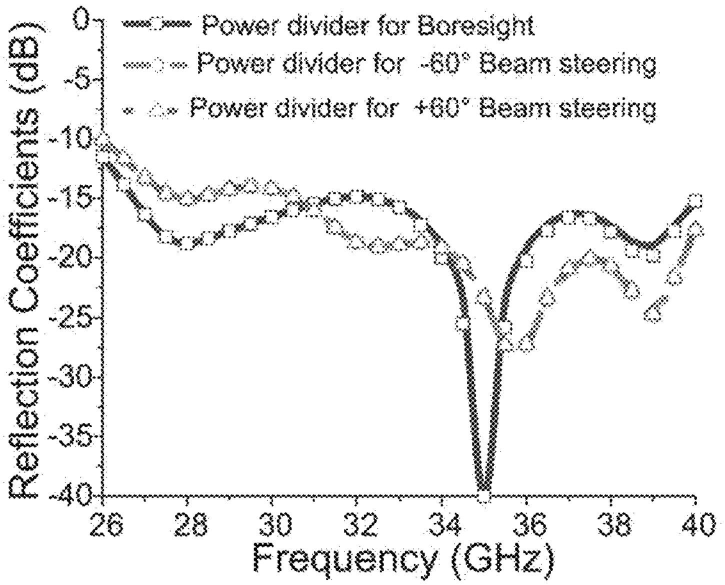
FIGS. 11A and 11B illustrate a simulated reflection coefficient and insertion loss of three T-shaped power dividers with predetermined different phase characteristics designed above.
Figure 11B:
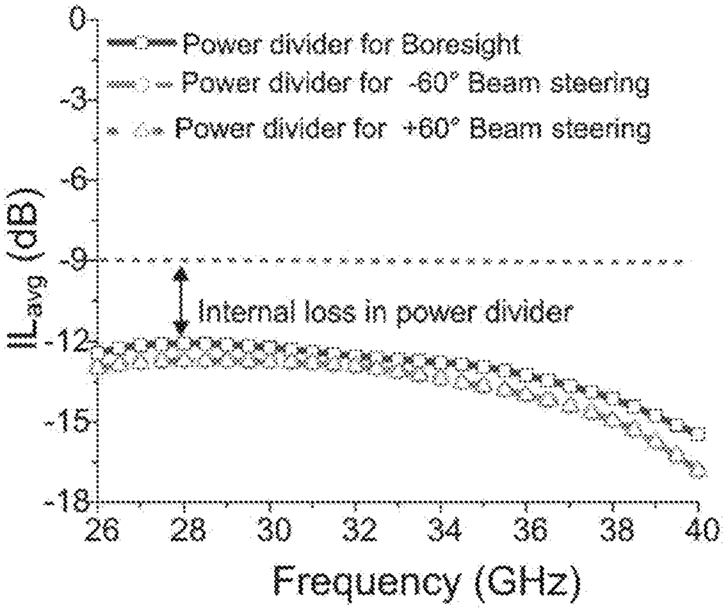

FIGS. 11A and 11B illustrate a simulated reflection coefficient and insertion loss of three T-shaped power dividers with predetermined different phase characteristics designed above.

It was confirmed that a 1×8 power divider designed in a tapered T-shaped junction structure had good impedance matching of −10 dB or less in a Ka band. Further, it can be seen that a simulated internal insertion loss of the designed 1×8 T-shaped power divider was 3 dB to 4.5 dB at less than 36 GHz, and a main cause of this loss is a high dielectric loss of the FR-4 substrate rather than impedance mismatching.

Figure 12A:
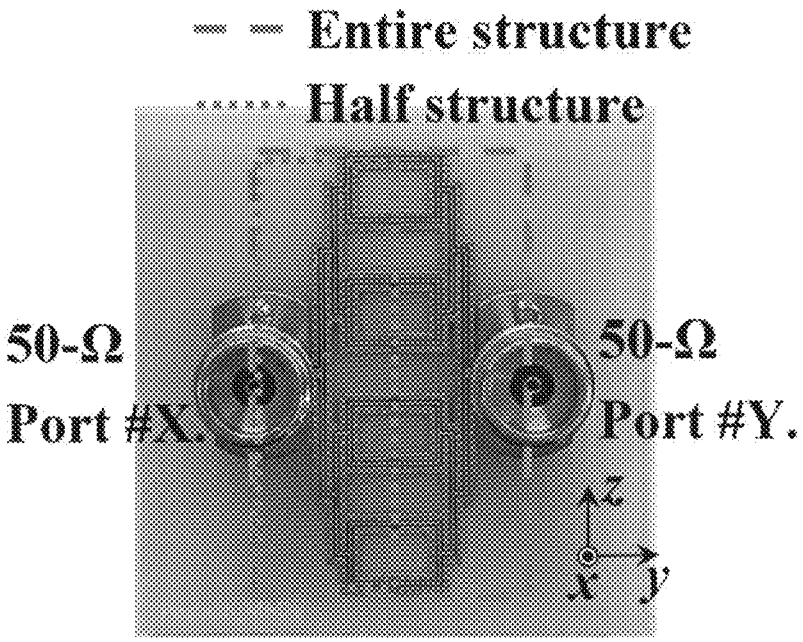
FIGS. 12A and 12B illustrate a sample image and a measured insertion loss of a symmetric T-shaped power divider.
Figure 12B:
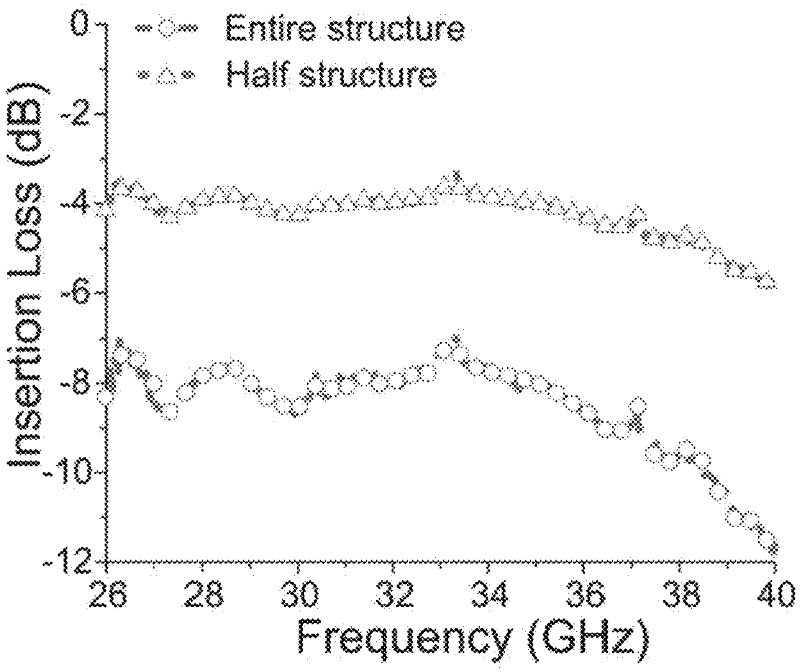

FIGS. 12A and 12B illustrate a sample image and a measured insertion loss of a symmetric T-shaped power divider.

A manufactured sample having a symmetrical structure including a 1×8 T-shaped power divider as illustrated in FIG. 12A is a good way capable of inferring an accurate insertion loss of a feeding network without power imbalance or oscillation. The symmetrical structure sample with the T-shaped power divider was simulated by inserting a landing pad modeling shape of a connector in order to consider an influence of the connector in an experiment. An insertion loss measured in an in-phase T-shaped power divider using the manufactured sample as illustrated in FIG. 12B ranges from 3.5 to 4.5 dB at less than 36 GHz.

Figure 13A:
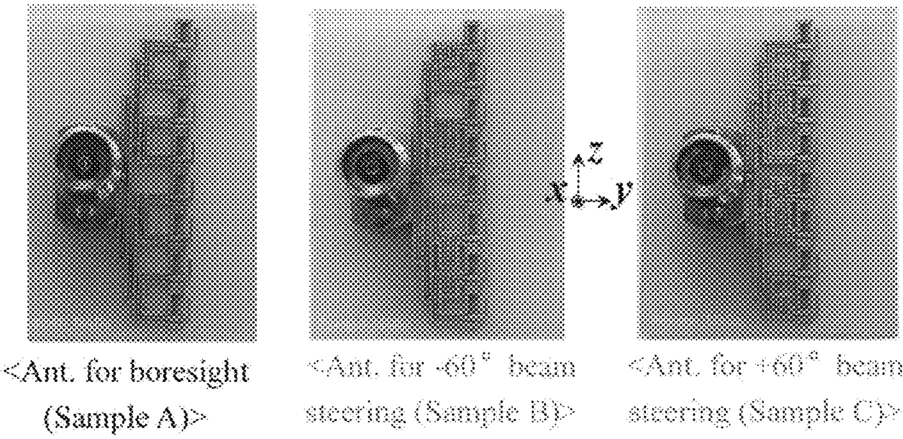
FIGS. 13A and 13B illustrate three sample images and measured reflection coefficient results of a phased array antenna manufactured for evaluation of wide-angle coverage characteristics.
Figure 13B:
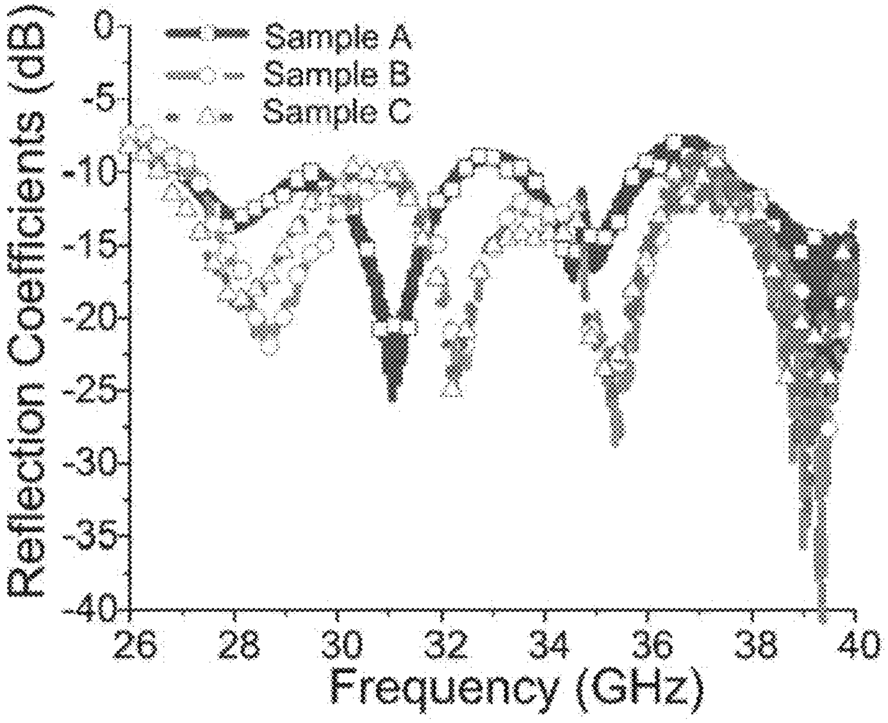
Figure 14A:
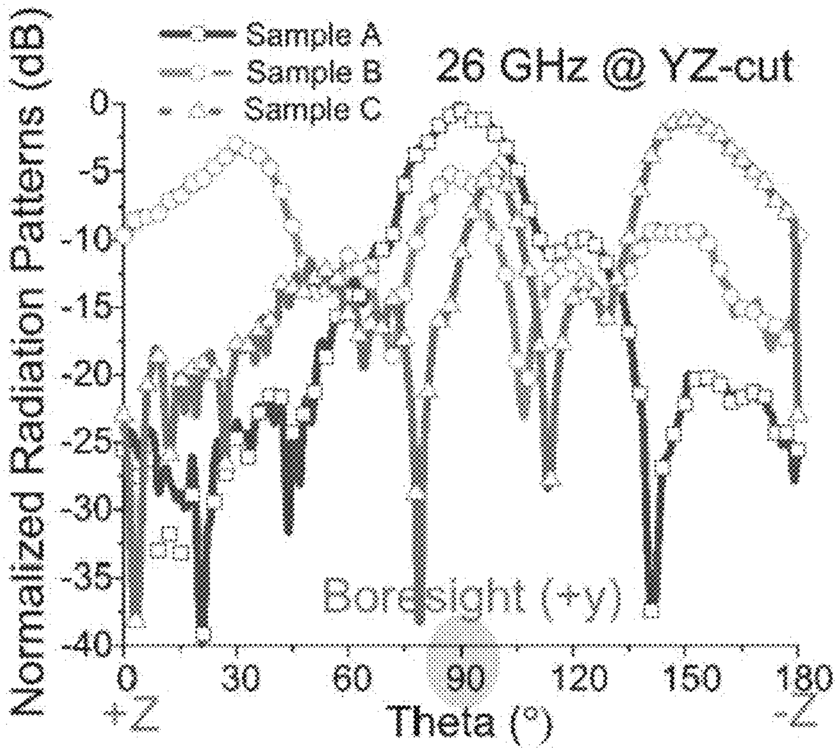
FIGS. 14A to 14F illustrate measured radiation patterns of three types of manufactured phased array antennas configured in an 8-element array.
Figure 14B:
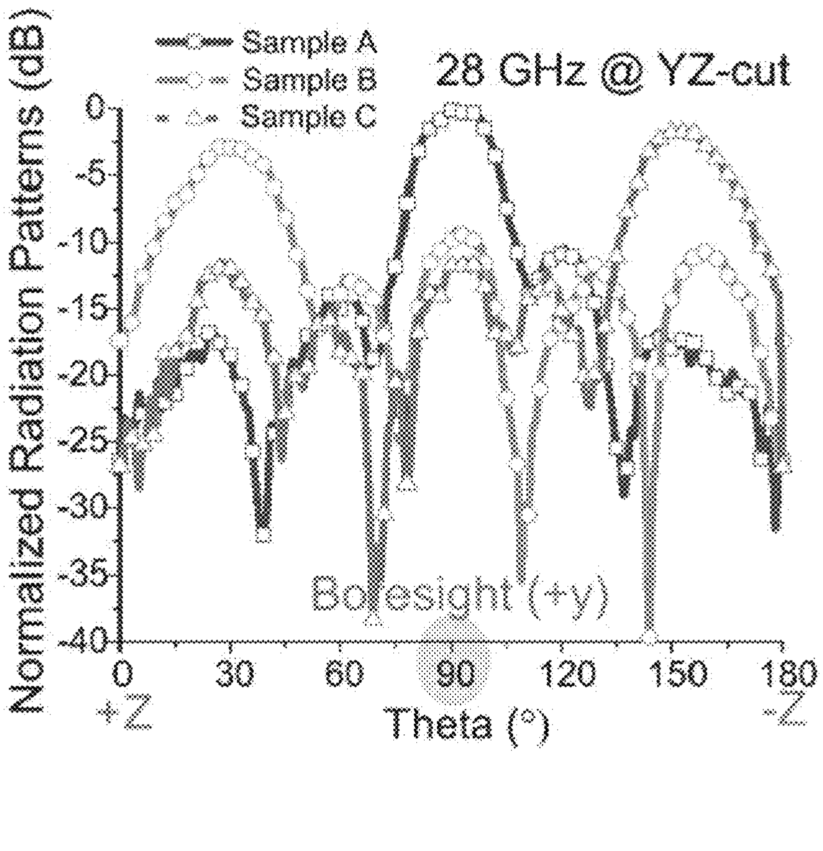
Figure 14C:
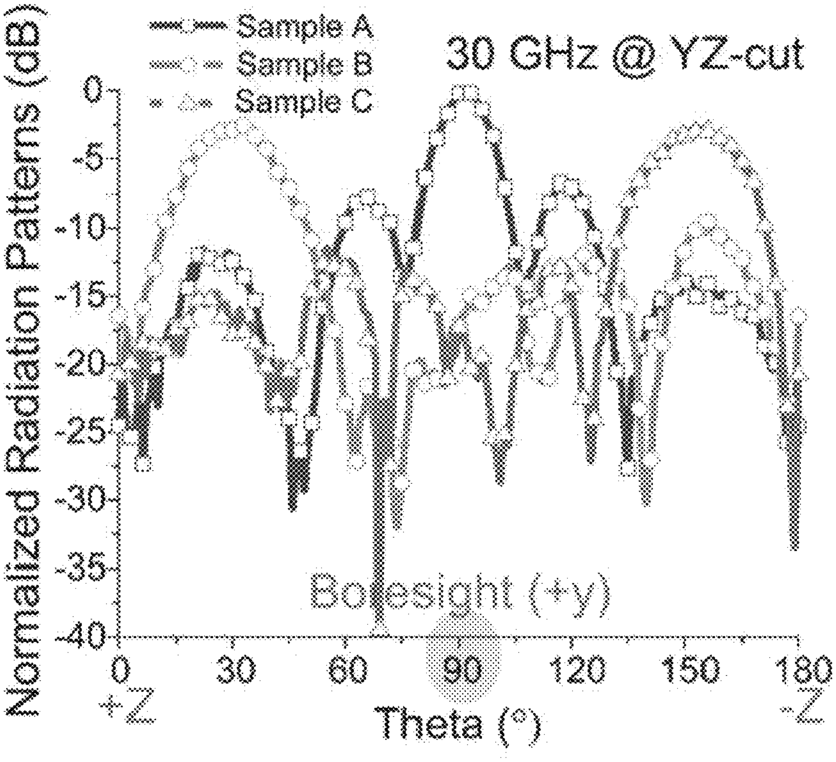
Figure 14D:
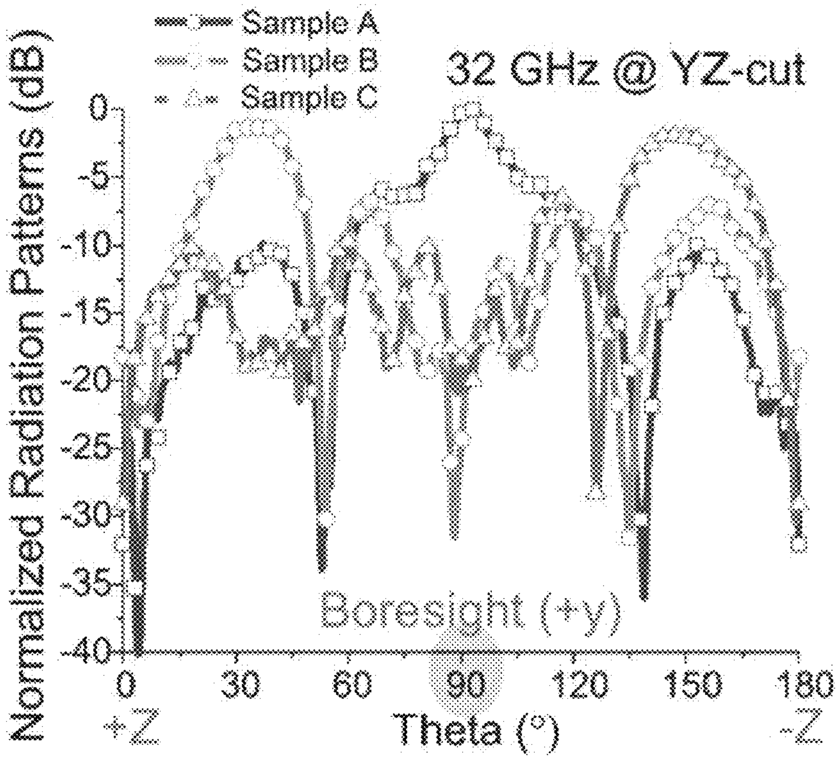
Figure 14E:
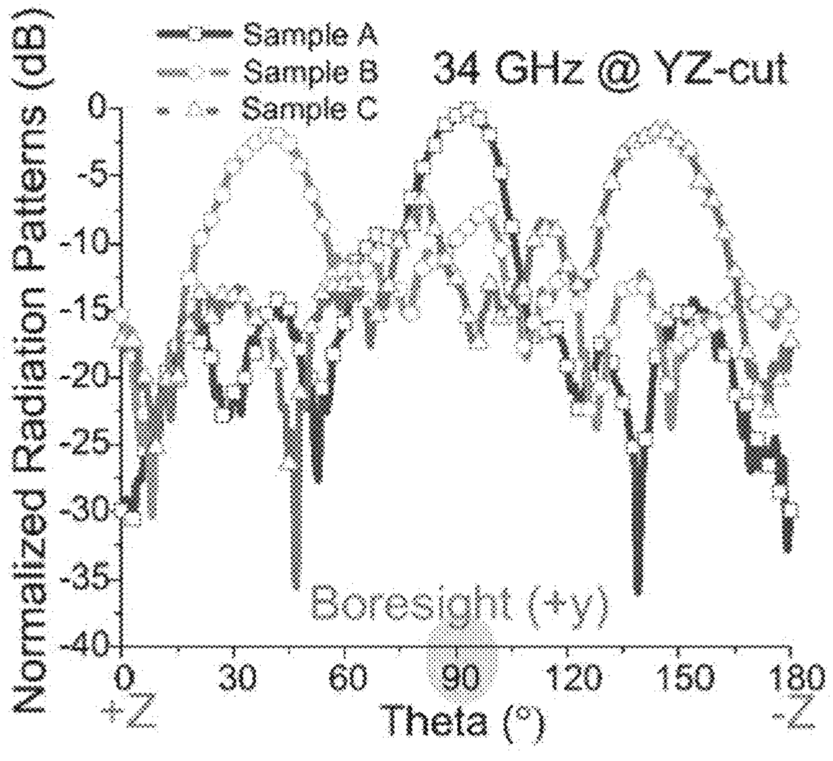
Figure 14F:
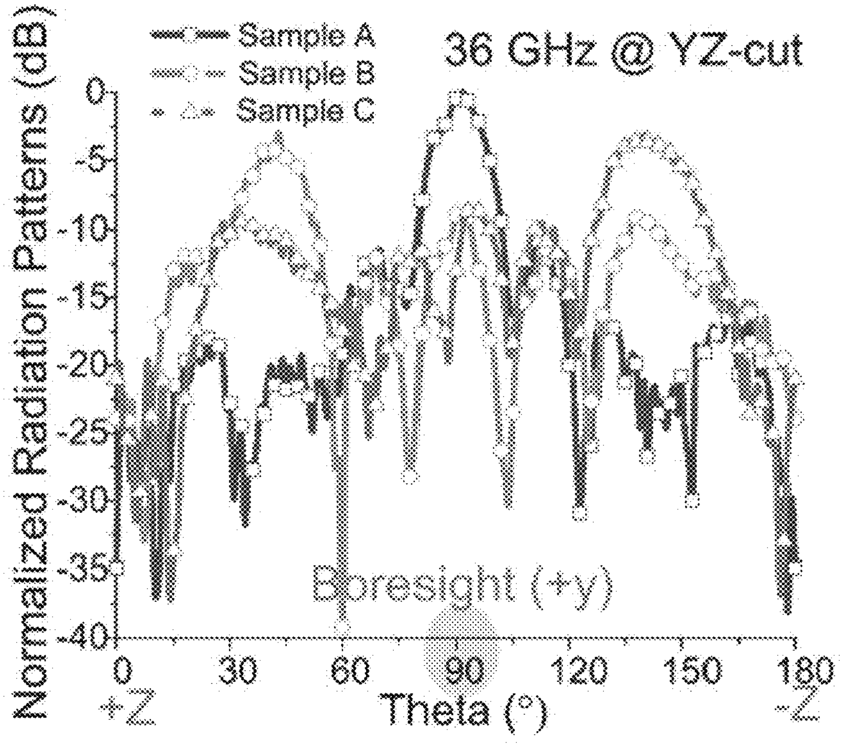
Figure 15A:
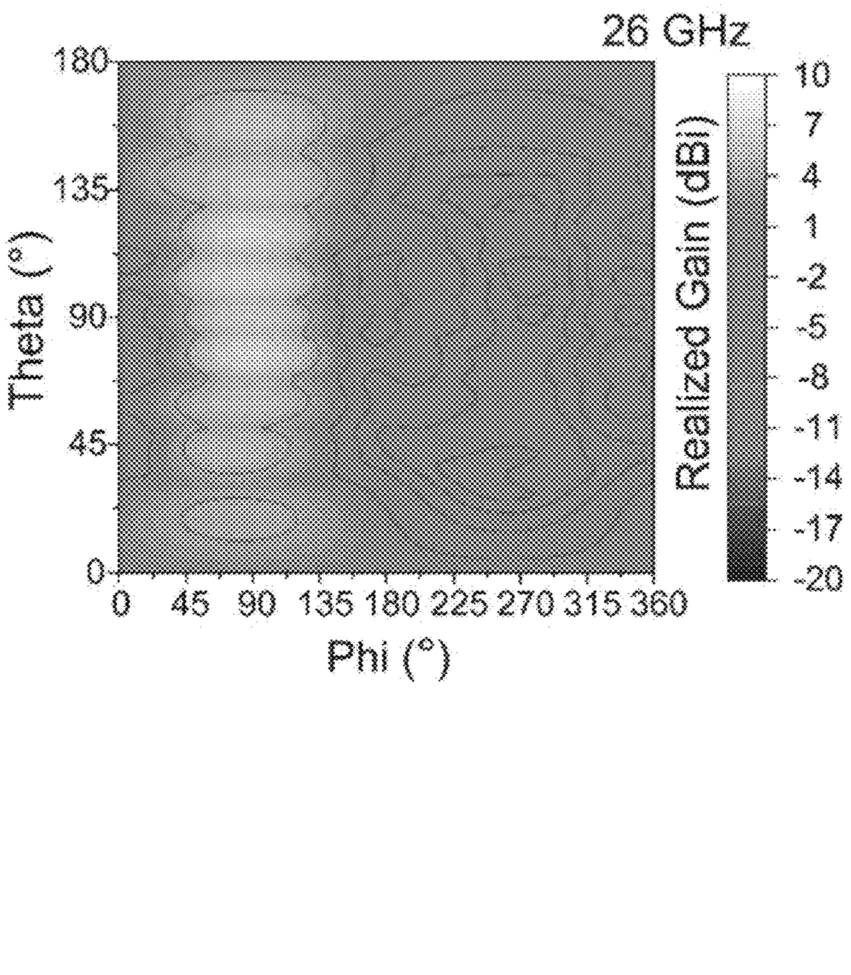
FIGS. 15A to 15F illustrate a total scan pattern of an 8-element array antenna.
Figure 15B:
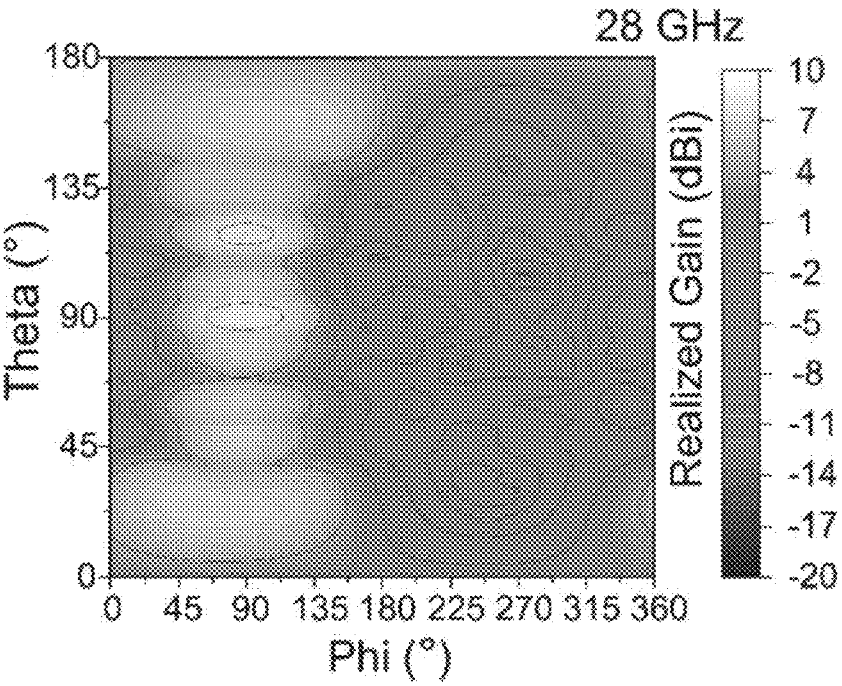
Figure 15C:
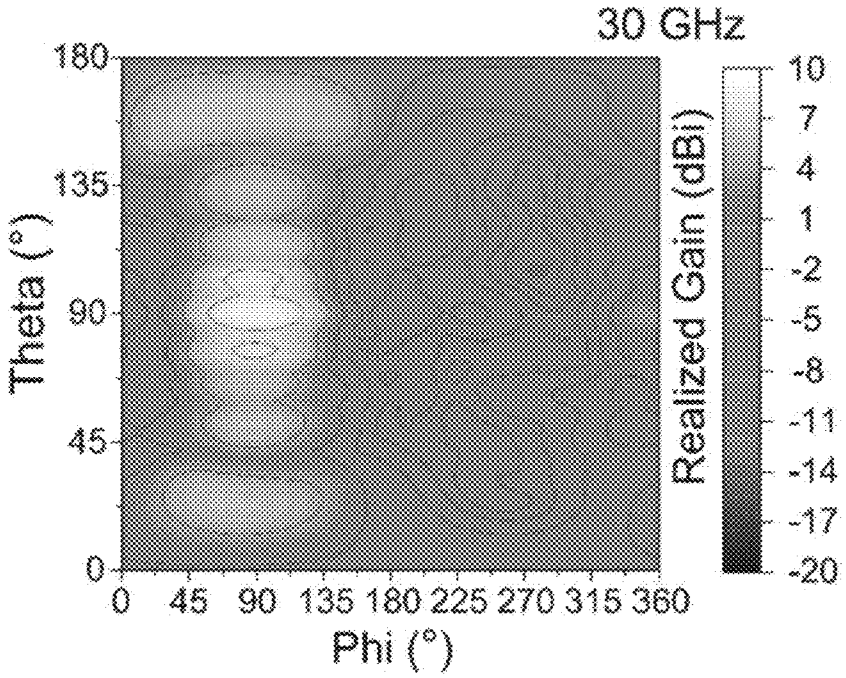
Figure 15D:
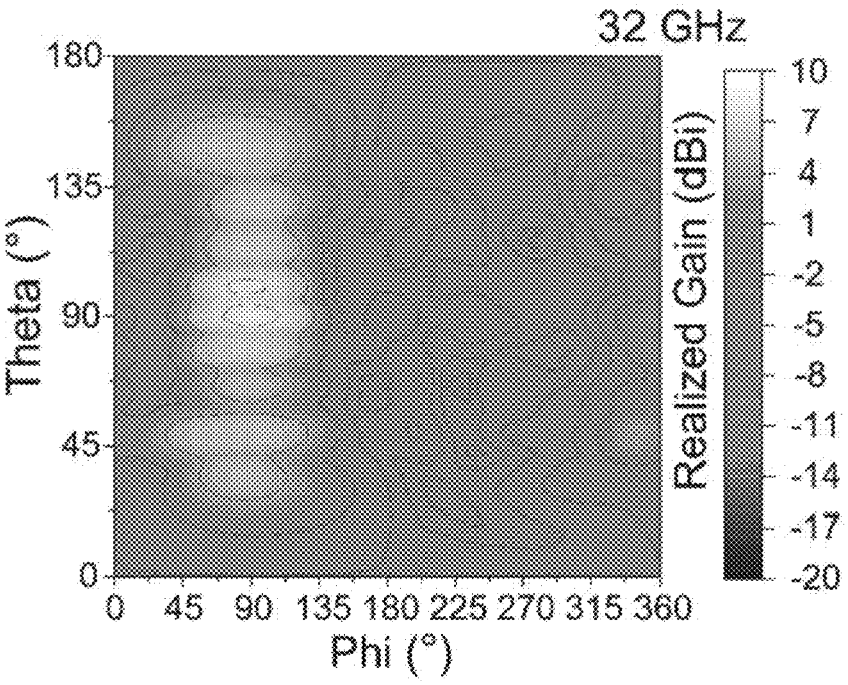
Figure 15E:
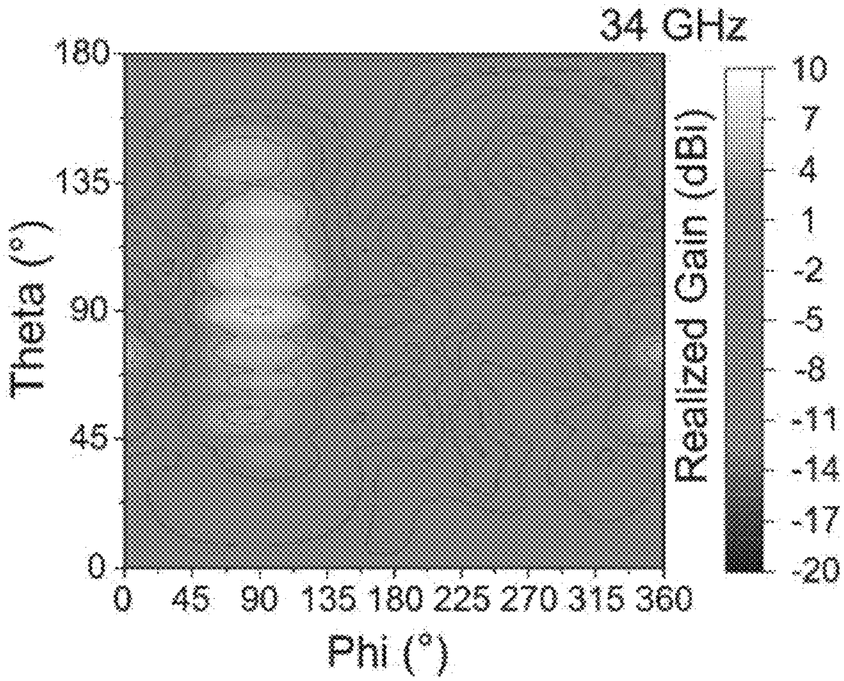
Figure 15F:
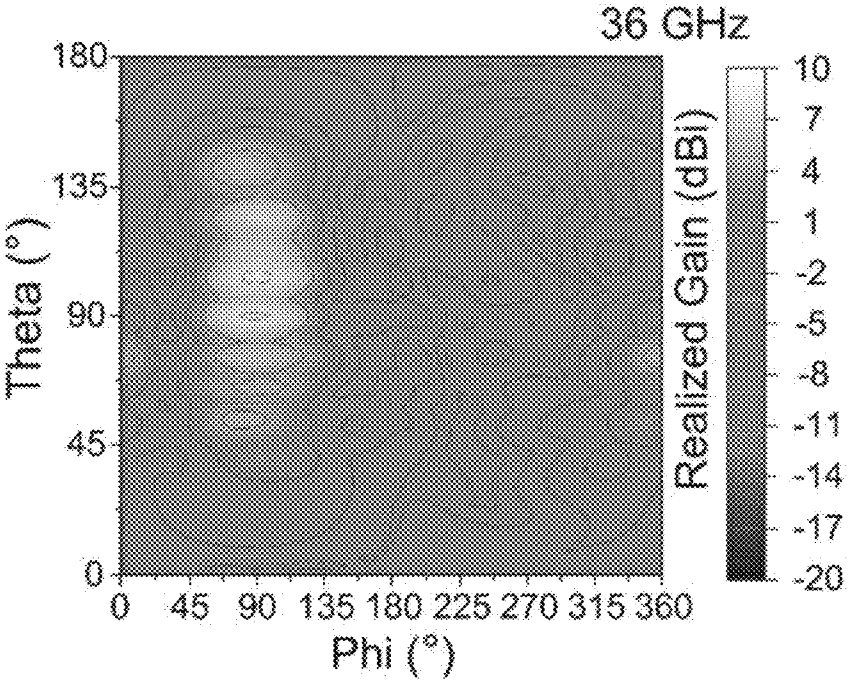

FIGS. 13A and 13B illustrate three sample images of a phased array antenna manufactured to evaluate wide-angle coverage characteristics and results of a measured reflection coefficient. With the array antenna manufactured on the basis of the three feeding networks (circuits reflecting a phase delay line for in-phase and ±60° beam steering), a wide impedance bandwidth between 26 GHz and 40 GHz was obtained.

FIGS. 14A to 14F illustrate measured radiation patterns of three types of manufactured phased array antennas configured in an 8-element array.

Radiation patterns were measured and compared in a horizontal plane of an array antenna manufactured to investigate a beam scanning performance of a proposed phased array characterized by a directional fan beam. With the manufactured array antenna, a beam scan range of 110° (±55°) or more was obtained within a 3 dB scan loss in a frequency range of 26 GHz to 36 GHz. As illustrated in FIGS. 14A to 14F, a half-power beam width of a main beam was smaller than that in the radiation pattern of the 4-element array antenna in FIG. 7D, and a side lobe level was reduced. Further, a ±5° beam squint phenomenon occurred in a frequency range of 32 GHz to 36 GHz, but it was verified that wide-angle scanning of 110° (±55°) or more can be still made within a bandwidth of 10 GHz and a scan loss of 3 dB. In the embodiment of the present disclosure, although the antenna performance only from 26 GHz to 36 GHz is shown, it was revealed the scan loss (which is increased from 3 dB to 5 dB, for example) is only degraded in a remaining range of 36 GHz to 40 GHz in a range of 26 GHz to 40 GHz, which is a regional millimeter wave 5G frequency band, and wide-angle beam scanning characteristics can be achieved. This makes it possible to sufficiently improve the performance from exemplary design matters of the present disclosure that exhibits sufficient wide-angle beam scanning characteristics in a broadband only with 26 GHz to 36 GHz.

In a beam steering scenario, a millimeter wave terminal antenna should exhibit a quasi-isotropic spherical coverage. In order to implement a stable spherical coverage, a maximum realized gain should be high and a slope of coverage efficiency should change relatively steeply. In order to obtain the coverage efficiency, a total scan pattern (hereinafter referred to as a TSP) was first simulated and analyzed. In particular, since the present disclosure focuses on a design and verification method for a single-layer FR-4 PCB packaging process-based millimeter wave antenna that can be applied to a terminal despite a manufacturing resolution of a 100 μm line width and a large dielectric loss material, the TSP and coverage efficiency analysis are important. In an antenna additionally designed for continuous beam scanning results, a feeding network including a predetermined phase delay line for ±15°, ±30°, and ±45° beam steering was utilized.

FIGS. 15A to 15F illustrate a total scan pattern of an 8-element array antenna.

As illustrated in FIGS. 15A to 15F, a wide-angle coverage reaching a beam scanning range of 110° (±55°) at 26 GHz to 36 GHz due to fan-beam characteristics for end-fire radiation was achieved.

Figure 16:
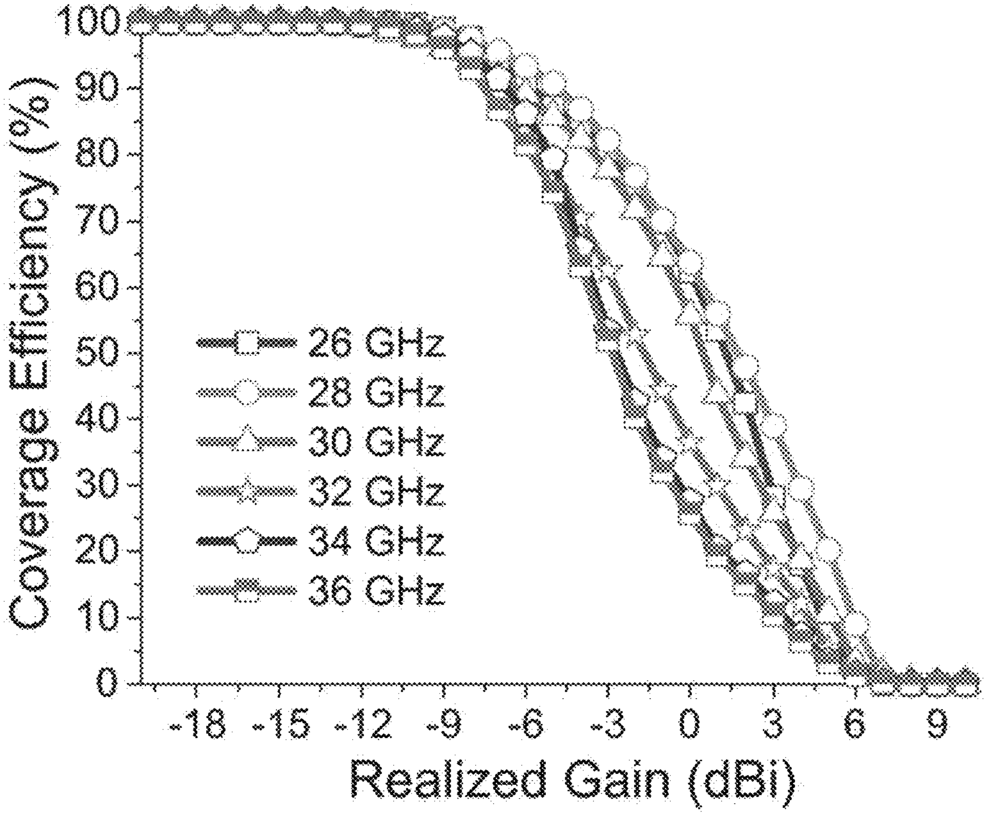
FIG. 16 illustrates coverage efficiency with respect to a realized gain of the 8-element array antenna.

FIG. 16 illustrates coverage efficiency with respect to a realized gain of the 8-element array antenna.

As illustrated in FIG. 16, the coverage efficiency was 50% or more at 26 GHz to 36 GHz and the realized gain is −1.5 dBi despite a high loss material property and a limited electrode manufacturing resolution of the FR-4 substrate, and applicability to a terminal antenna was verified.

FIG. 17 illustrates a table showing a comparison of performance between horizontally polarized end-fire radiation millimeter wave antennas for a terminal in the related art.

A small array antenna manufactured using an ILA topology including a high impedance surface (a one-dimensional EBG and a via wall) structure in a single-layer FR-4 PCB-based antenna element exhibited a wide impedance bandwidth and a wide-angle scanning function. Further, a CPWG transmission line with a dense via wall structure in an island shape minimized power leakage to the outside of a feeding network despite a relative loss in a material of the FR-4 substrate and supplied optimal power to an array antenna. Realized gains of the manufactured 4- and 8-element phased array antennas were 6 dBi and 8.1 dBi, respectively, as an insertion loss of the feeding network was kept below 0.23 dB/mm. With a design method for the antenna according to the embodiment of the present disclosure, it is possible to provide a spherical coverage in a broadband at a much lower production cost compared to the state-of-the-art antenna presented in the table when the design method is applied to a terminal in future.

Although the present disclosure has been described above with reference to the drawings and embodiments, the scope of protection of the present disclosure is not intended to be limited by the drawings or embodiments, and it will be understood by those skilled in the art that various modifications and changes of the present disclosure can be made without departing from the spirit and scope of the present disclosure defined in the claims.

What is claimed is:

1. A phased array antenna with a high impedance surface, the phased array antenna comprising:

a plurality of unit elements, wherein each of the plurality of unit elements includes:

a substrate;

a partial ground plane formed at least partially on the substrate;

a planar inverted-L radiator disposed on the partial ground plane; and a via wall integrated in parallel on both edges of the partial ground plane, wherein a one-dimensional electromagnetic bandgap (EBG) structure is embedded in an edge of a planar radiator side of the partial ground plane, wherein the phased array antenna has a structure in which a one-dimensional EBG structure and an inverted-L antenna unit element are integrated, and a mutual coupling path between the plurality of unit elements caused by a surface current flowing through a common ground plane is suppressed due to high impedance surface characteristics of the via wall, compared to a linearly arrayed phased array antenna without the via wall, and wherein the phased array antenna further comprises:

a feeding network configured of a coplanar waveguide with ground (CPWG) transmission line including a plurality of island-shaped via walls serving as a high impedance surface for reducing leakage power; and a power distribution circuit, the power distribution circuit including a tapered T-shaped power divider to facilitate impedance matching and low loss feeding despite a constraint of electrode manufacturing resolution of an FR-4 PCB process with a preset minimum line width.

2. The phased array antenna according to claim 1, wherein the plurality of unit elements are linearly arrayed within $0.39\lambda_0$, $\lambda_0$ being a wavelength in a free space.

3. The phased array antenna according to claim 1, wherein the one-dimensional EBG structure includes a plurality of periodic unit cells, and the plurality of periodic unit cells are arrayed in a line at the edge of the planar radiator side of the partial ground plane.

4. The phased array antenna according to claim 3, wherein the plurality of periodic unit cells configured in the one-dimensional EBG structure includes a meander strip line utilizing a single-layer FR-4 PCB process.

5. The phased array antenna according to claim 3, wherein the one-dimensional EBG structure is configured to operate as a high impedance surface having a slower wave behavior to be able to exhibit quadratic reflection phase than an antenna without a one-dimensional EBG structure.

6. The phased array antenna according to claim 3, wherein the phased array antenna is configured to operate as a high impedance surface having a slower wave behavior than an antenna without a one-dimensional EBG structure in a horizontal direction of an edge of the one-dimensional EBG structure so that surface wave control is able to be performed.

7. The phased array antenna according to claim 1, comprising:

a high impedance surface instead of a Balun, the Balun being an auxiliary circuit, such that wide-angle beam steering is allowed in a broadband and spherical coverage characteristics are provided despite utilization of a single-layer FR-4 PCB process.

* * * * *